US012545558B2

(12) United States Patent
Richter

(10) Patent No.: US 12,545,558 B2
(45) Date of Patent: Feb. 10, 2026

(54) MOBILE CRANE HAVING A GUYED TELESCOPIC BOOM

(71) Applicant: Liebherr-Werk Ehingen GmbH, Ehingen/Donau (DE)

(72) Inventor: Yggve Richter, Blaubeuren (DE)

(73) Assignee: LIEBHERR-WERK EHINGEN GMBH, Ehingen/Donau (DE)

( * ) Notice: Subject to any disclaimer, the term of this patent is extended or adjusted under 35 U.S.C. 154(b) by 400 days.

(21) Appl. No.: 18/103,593

(22) Filed: Jan. 31, 2023

(65) Prior Publication Data

US 2023/0242383 A1 Aug. 3, 2023

(30) Foreign Application Priority Data

Feb. 1, 2022 (DE) ..................... 10 2022 102 318.4

(51) Int. Cl.
*B66C 23/36* (2006.01)
*B66C 23/70* (2006.01)
*B66C 23/82* (2006.01)

(52) U.S. Cl.
CPC ............ *B66C 23/36* (2013.01); *B66C 23/703* (2013.01); *B66C 23/828* (2013.01); *B66C 2700/0357* (2013.01)

(58) Field of Classification Search
CPC ... B66C 23/821; B66C 23/823; B66C 23/826; B66C 23/703; B66C 23/828
See application file for complete search history.

(56) References Cited

U.S. PATENT DOCUMENTS 6,550,624 B1 * 4/2003 Irsh ....................... B66C 23/823 52/118
9,637,358 B2 * 5/2017 Knecht ................. B66C 23/705
(Continued)

FOREIGN PATENT DOCUMENTS

DE 10062517 C2 6/2002
DE 102005049606 A1 * 4/2007 ............. B66C 23/42
WO 2018/134249 A1 7/2018

OTHER PUBLICATIONS

DE 10062517 C2 Machine Translation. (Year: 2002).*
DE 102005049606 Machine Translation (Year: 2007).*

*Primary Examiner* — Anna M Momper
*Assistant Examiner* — Juan J Campos, Jr.
(74) *Attorney, Agent, or Firm* — Dilworth & Barrese, LLP

(57) ABSTRACT

The invention relates to a mobile crane having a telescopic boom that is luffably coupled to a superstructure and that comprises a coupling section and at least one telescopic section supported therein in a retractable and extendable manner. At least one guying support is fastened to the coupling section and is connected to the coupling section or to the superstructure via a first guying and to a connection piece at a telescopic section via a second guying. In accordance with the invention, the second guying comprises at least two guying elements coupled with one another. The second guying is thereby adjustable in length and is thus adaptable to the extension length of the telescopic boom such that at least one of the mutually coupled guying elements is directly releasably connectable to the guying support. The invention further relates to a guying system for a mobile crane in accordance with the invention, to a method of moving a mobile crane in accordance with the invention into a guyed work position, and to a method of varying the (Continued)

extension length of the guyed telescopic boom of a mobile crane in accordance with the invention.

20 Claims, 10 Drawing Sheets

(56) References Cited

U.S. PATENT DOCUMENTS

| | | | | |
|---|---|---|---|---|
| 11,130,659 | B2 * | 9/2021 | Muller | B66C 23/706 |
| 11,174,137 | B2 * | 11/2021 | Muller | B66C 23/702 |
| 2002/0070187 | A1 * | 6/2002 | Willim | B66C 23/828<br>212/299 |
| 2004/0040926 | A1 * | 3/2004 | Irsch | B66C 23/828<br>212/347 |
| 2004/0168997 | A1 * | 9/2004 | Irsch | B66C 23/828<br>212/195 |
| 2011/0272375 | A1 * | 11/2011 | Willim | B66C 13/066<br>212/273 |
| 2012/0265411 | A1 * | 10/2012 | Deng | B66C 23/823<br>701/50 |
| 2018/0029853 | A1 * | 2/2018 | Hamaguchi | B66C 23/88 |
| 2019/0359457 | A1 * | 11/2019 | Muller | B66C 23/706 |
| 2020/0189888 | A1 * | 6/2020 | Muller | B66C 23/702 |

* cited by examiner

MOBILE CRANE HAVING A GUYED TELESCOPIC BOOM

BACKGROUND OF THE INVENTION

The present invention relates to a mobile crane in accordance with the preamble of claim 1, to a guying system for such a mobile crane, to a method of moving such a mobile crane into a work position, and to a method of varying the extension length of the telescopic boom of such a mobile crane.

Mobile cranes are known from the prior art whose telescopic booms are guyed by a spatial guying for a payload increase. A specific example is the so-called Y guying with two guying supports that are installed at the coupling section of the telescopic beam, can be spread in V shape, and that are also called guying frames or TY frames. Two guying strands are guided via a respective guying support to one of the telescopic sections telescopically supported in the coupling section, for example to a pulley head or telescopic head at the jib of the main boom or to an adapter piece via which a boom extension (e.g. a fixed jib or a luffing fly jib) is installed at the maim boom. The lateral stability of the telescopic boom and thus the maximum payload can thereby be effectively increased.

The guying supports are typically coupled to a respective pivot frame that is pivotably fastened to the upper side of the coupling section so that the guying supports can be erected by pivoting the respective pivot frame by means of a hydraulic tip cylinder.

Each guying strand here typically comprises a first guying that connects the guying support to the boom base at the coupling section via one or more guy rods and a second guying that connects the guying support to the fastening point at the telescopic section. The second guying is length variable to make possible a guying at different extension lengths of the telescopic cylinder (=telescopic lengths). This is typically achieved via down ropes in the prior art that are supported in a manner able to be reeled up and out on guying winches installed in the guying supports.

With known guying systems, the guying procedure, i.e. the establishing of the guyed state of the mobile crane, as a rule takes place as follows (the following statements relate to one of the two guying supports of a Y guying, but apply analogously to telescopic booms having a single guying strand):

The guy rods of the first guying are first connected, i.e. in particular bolted, to the boom base. The guying support is subsequently erected with the aid of the tip cylinder and the guy rope of the second guying is fastened to the telescopic head or to another connection piece at one of the telescopic sections. The tip cylinder is also always under pressure during crane work and presses the guying support toward the guy rods. Once the telescopic boom has been telescoped out to its desired length, the telescopic boom is preloaded via the guying winch. This can take place as a rule on the basis of a measurement of the angle of rotation of the guying winch via a specific force via the guying winch (force controlled) or over a certain length of the guy rope (length controlled).

Such guying systems based on guy ropes and guying winches have a series of disadvantages. On the one hand, the high costs and the high weight of the guying distribution and of the guying winches can be named. A guy rope furthermore requires a high safety factor as a guy rod based on its construction, e.g. due to the strands of the rope that are not visible from the outside due to sagging of the rope through winding up, etc. and therefore have to have a comparatively large diameter. Guy ropes furthermore have a smaller Young's modulus than guy rods since the stretching of a rope is greater due to the twisted strands than the stretching of a pole.

Finally, tolerances result in guy ropes due to windings of different tightness or due to different rope diameters/rope lengths (length differences result mainly on the length controlled preloading via the guying winches—this is particularly problematic with a Y guying in the relationship of the right guy rope to the left guy rope).

SUMMARY OF THE INVENTION

Against this background, it is the underlying object of the present invention to provide a guying system for telescopic booms that avoids the aforesaid disadvantages of the prior art. A lighter, less expensive guying that achieves a higher maximum payload should in particular be provided for telescopic booms.

This object is achieved in accordance with the invention by a mobile crane having the features herein. Advantageous embodiments of the invention result from the following description.

A mobile crane is accordingly proposed having a telescopic boom that is luffably coupled to a superstructure and that comprises a coupling section and at least one telescopic section supported therein in a retractable and extendable manner. The telescopic boom is guyed by means of a guying system that comprises at least one guying support fastened to the coupling section and a first guying and a second guying. In the guyed state, the guying support is connected to the coupling section or to the superstructure, preferably to a boom base at the coupling section, via the first guying and is connected to a telescopic section by a connection piece via the second guying. The second guying is length variable to be able to guy the telescopic boom at different extension lengths at which the connection piece adopts a respective different distance from the guying support.

In accordance with the invention, the second guying comprises at least two guying elements that are coupled to one another and of which at least one is directly releasably connectable to the guying support when required. The length of the second guying can therefore thereby be set and thus adapted to the extension length of the telescopic boom in that a specific guying element is directly connected to the guying support (so that specific guying elements may not contribute to the total length of the second guying). In this respect, the guying elements are not separated from one another, but rather remain connected to one another. The guying thereby does not have to be modified in a complex manner (for example by installing or removing guying elements) to adapt its length.

The fact that at least one guying element is directly connectable to the guying support means that a direct connection to the guying support or to a connection means fixedly or movably connected to the guying support takes place. Said guying element is in particular not merely indirectly connected to the guying support via one of the other guying elements in the directly connected state, but is rather itself coupled to the guying support.

The present invention therefore proposes no longer guying the telescopic boom in the region of the second guying using a guy rope, but rather via a discrete number of guying elements coupled to one another in an articulated manner and to achieve the desired guying length in that a specific number of the guying elements coupled to one another is used between the guying support and the connection piece for the guying. Depending on which of the mutually connected guying elements is directly connected to the guying support, a longer or shorter second guying results.

This guying system dispenses with guy ropes and special guying winches, but is rather based on guying elements that are connected to one another and that can in particular be formed as guy rods that have a greater stiffness and overall a smaller weight.

Discrete extension lengths of the telescopic boom at which it can be guyed first result at a specific position of the guying support due to the discrete design of the second guying. It is, however, known from some telescopic booms, on the one hand, to bolt the different telescopic sections to one another at specific extension lengths so that the guying lengths or guying elements can easily be adapted to these discrete bolting positioning without losing flexibility overall. On the other hand, a guying of the telescopic boom is only required or sensible at all in a specific extendable region since the boom has sufficient base stiffness at small extension lengths. All the extension lengths of the telescopic boom thus do not have to be covered by the second guying.

Since the guying support is as a rule, however, anyway pivotably installed at the coupling section (in particular with a Y guying at which the guying supports can be erected or spread), a large number or guying lengths can optionally be covered, in dependence on the exact design and pivotability of the guying support possibly also a continuous region of guying lengths, by means of the guying system in accordance with the invention by varying the continuously settable angle at which the guying boom stands with respect to the longitudinal axis of the telescopic boom in combination with a specific number or sequence of guying elements.

The present invention is not restricted to a specific kind of guying or telescopic boom configuration, but can rather be used with a Y guying, with a guying by means of a single pivotable or rigid guying support and, with telescopic booms with or without an extension.

The connection piece can designate a connection region at a boom head, at a collar of a telescopic section, at a boom extension, or at an adapter piece. Initially, no particular structural or functional demands have to be made on the connection piece except for it moving relative to the coupling section on the telescoping in and out.

Provision is made in a possible embodiment that at least one guying element is formed as a guy rod. The term guy rod is to be given a broad interpretation here and is not restricted to a specific shape and length. The guy rod can, for example, be configured as a hollow section having any desired cross-section geometry as a metal sheet or as a solid rod or can comprise a plurality of these elements. The guy rod can be rigid throughout or can have one or more joints between the two ends.

At least one guy rod preferably comprises a joint in the middle region (also called an articulated joint in the following), which enables a folding together of the guy rod. The statement that the joint is arranged in a middle region does not preclude here that one of the two partial rods separated by the joint is longer than the other partial rod. The axis of the joint is preferably perpendicular to the longitudinal axis of the guying support so that the guy rod can, for example, be placed at the guying support in the folded together state.

The second guying preferably comprises a plurality of guy rods that are coupled with one another at their ends. The guy rods can have the same length or different lengths. Every guy rod advantageously has an individual length, however. The articulated connection of two guy rods is preferably implemented by a pivot bolt.

Provision is made in a further possible embodiment that a first guying element is permanently coupled, in particular coupled in an articulated manner, with the connection piece in guying operation (i.e. in crane operation with a guyed telescopic boom). Provision can be made here that this first guying element is likewise selectively directly releasably connectable to the guying support. In this case, the shortest guying length is formed by the length of the first guying element itself.

The first guying element can be a rope piece having a fixed length or a guy rod as described above. On a use of a rope piece, the advantages of the invention, however, equally come to the fore since the tolerances remain within limits due to the short length in comparison with the total guying and the use of a winch is dispensed with. At the same time, the advantage results with a rope piece that unlike the use of a guy rod at the connection point to the connection piece, a universal joint can be dispensed with. A rope piece can here imitate the required degrees of freedom of a swivel and the axes of the joint connections of the remaining guying elements are still aligned in parallel.

A last guying element that is preferably formed as a guy rod with a center joint is ideally permanently coupled to the guying support. This articulated connection is therefore not a "releasable connection" in the sense of the invention since it cannot be selectively released or established to vary the guying length.

Provision is made in a further possible embodiment that at least two guying elements, preferably all the guying elements, have different lengths.

In a further possible embodiment, a guide rope is provided that is in particular supported on a guide rope winch or at the guying support in a manner able to be reeled up or down, The guide rope runs from the connection piece or from the first guying element connected to the connection piece in the direction of the guying support and can there be guided to the guide rope winch via one or more deflection pulleys. It is likewise possible that the guide rope is guided from the guying support into the region of the connection piece and optionally beforehand via one or more deflection pulleys, that can in particular be attached to any desired guying element, to any desired fixed point at an element of the boom. The first guying element can also be designed as a guy rod having an in particular center articulated joint and can be suspended at the guide rope.

The end of the guide rope spaced apart from the guying support is preferably rotatably supported, for example at a bolt of the first guying element rotatable about an axis transverse to the guide rope or at a correspondingly rotatable attachment point at the connection piece.

The guide rope here does not serve the guying of the telescopic boom, i.e. the taking up of guying forces, but rather the guiding of the guying elements of the second guying used for the guying. For this purpose, at least one guying element, preferably, however, all of the guying elements, of the second guying is connected to the guide rope so that the guying elements are arranged between the guying support and the connection piece along the guide rope also called a pilot rope. At least one guying element is preferably displaceably suspended or "threaded" on the guide rope, in particular at both ends. Said guying element is thus in particular displaceably suspended as a whole on the guide rope.

The guying element or elements suspended at the guide rope can be suspended via spacing elements that can, for example, roll off on the guide rope via guide pulley and/or via slide surfaces thereon. The spacer elements can be arranged between adjacent guying elements in the regions of the connection joints. The spacer elements can optionally simultaneously serve as spacers for maintaining a defined distance of the guying elements from the guide rope and/or in the folded together state with respect to one another and can have corresponding mechanical abutments.

Since the guide rope solely serves the assembly, i.e. the adaptation of the guying to the desired length of the telescopic boom, and in particular the guidance of the mutually coupled guying elements on the assembly and does not have to take up the forces conducted via the second guying, it can have a substantially smaller diameter than the guy ropes used for guying in the prior art.

The guide rope winch can in particular be controlled or regulated such that a defined force or rope tension is always adopted in the guide rope on the telescoping in and out of the telescopic boom. For this purpose, a rope force in the guide rope and/or a torque acting on the guide rope winch can be measured via at least one sensor and can be provided to a control and/or regulator unit for controlling and/or regulating the guide rope winch. The guide rope therefore preferably always tracks the telescopic boom with a defined force. The maintaining of a specific rope tension in the guide rope not only represents a defined guidance of the guying elements, but rather, in the case of a plurality of guy rods having a central articulated joint, in particular also a controlled folding together of the guy rods.

Provision is made in a further possible embodiment that the guying support comprises a holding device having a movable holding element that is movable from a holding position into a release position and vice versa by means of an actuator. Those guying elements that are not used for the guying are held in or by the holding device.

The holding position is characterized in that the guying elements not used for guying in guying operation and optionally folded together via their central joint are held at the guying support by means of the holding element. At the same time, the holding element is in particular adapted such that it reliably conducts the forces transmitted via the second guying in the holding position.

The holding element therefore in particular represents the connection between the functional part, i.e. the part of the second guying used for guying, with the holding element being able to be used as part of the guying support. The holding element could simultaneously also be considered part of the guying. In this respect, the holding element so-to-say mechanically bridges the guying elements not used for guying and in particular folded together.

The release position of the holding element is characterized in that the guying elements not used for guying and in particular folded together in guying operation are released and can be moved out of the holding device by a telescoping out of the boom (with them in particular simultaneously folding outward and adopting their maximum lengths) to extend the second guying. It is conversely possible in the release position to place guying elements in the holding device by telescoping the boom in (with said guying elements in particular folding together simultaneously) to achieve a shortened second guying. After reaching the desired length of the second guying, the holding element can again be moved into the holding position to fix the guying elements not used for the guying and in particular folded together in the holding device.

The described taking up of the placed guying elements and the placing down of the no longer required guying elements preferably takes place automatically by telescoping the telescopic boom automatically out and in while using gravity, in particular in a steep or steepest position of the telescopic boom. The latter can also be characterized in that the angle of the telescopic boom amounts to more than 45° in comparison with its completely placed down position.

The holding element can in particular be moved to and fro between the holding position and the release position by a hydraulic cylinder. At the same time, the hydraulic cylinder can exert a constant force on the holding element in the direction of the holding position during the guying operation so that it cannot release itself. On the other hand, the exact holding position can vary in dependence on the number of the guying elements used for the second guying so that it is ensured by the hydraulic cylinder and its constant pressure on the holding element that the latter also actually moves into the holding position valid for the current configuration independently of the exact configuration.

A separate locking device can naturally be provided by means of which the holding element is reversibly lockable in the holding position. For this purpose, for example, a mechanical or an actuator controlled locking mechanism can be used.

The holding element can comprise one or more hook elements that can grip the corresponding catch elements at the guying elements. The catch elements can be pivot bolts of the joints that connect the guying elements. The pivot bolts can project laterally, in particular at both sides, from the connection joints to be able to be gripped by the hook elements of the holding element. In order not to slip out laterally, the longitudinal bolts can have an increased diameter or a mushroom-shaped end region or other stop elements at the front sides.

Provision is made in a further possible embodiment that the guying support comprises a guide and support device on which guying elements not used for guying and in particular folded together are supportable and are preferably fixable during guying operation. The guide and support device can for this purpose cooperate with the previously named holding device or with the holding element to hold the guying elements that are not used in position. At the same time, the guide and support device can be designed such that an automatic placement movement of guying elements no longer to be used or an automatic take up movement of guying elements now to be used for the guying is facilitated and is guided in a controlled manner.

Provision can be made that the holding element blocks a movement of the guying elements supported on or in the guide and support device in the holding position and releases same in the release position.

In a preferred embodiment, all of the guying elements or all of the guying elements except for the first guying element connected to the connection piece are configured foldably with a respective joint arranged between the two ends and can be received or supported in the folded together state at or in the guide and support device. The supported guying elements are securely held in the holding position by the holding element so that they cannot slip out of the guide and support device.

Provision is made in a further possible embodiment that the guying support is fastened in an articulated manner to the coupling section and is preferably pivotable by means of an actuator, in particular a hydraulic tip cylinder. On one hand, guying support can thereby be laid alongside the telescopic boom for transport and can be erected for guying operation. On the other hand, it is thereby possible to vary the angle of inclination of the guying support relative to the coupling section. A defined tension in the second guying can thereby be generated, for example. It is likewise conceivable to produce a guying of a specific extension length of the telescopic cylinder by a targeted selection of the angle of inclination in combination with a specific sequence of the guying elements used for the guying (i.e. the guyable telescopic length in particular results from a combination of the angle of inclination of the guying support continuously settable within a specific angular interval and the discrete length of the second guying in dependence on which of the guying elements is directly connected to the guying support).

Provision is made in a further possible embodiment that the first guying comprises at least one length variable element, in particular a hydraulic tensioning cylinder, by means of which the length of the first guying is variable. The angle of inclination of the guying support can advantageously be directly varied by an actuation of the length variable element (the corresponding tip cylinder of the guying support is optionally bridged here or a coordinated or synchronized control of both cylinders takes place). This can be used, for example, to set a defined preload in the first and/or second guying. For this purpose a measurement of the length, pressure, and/or tension can take place in an actuator acting as a length variable element, with the measured values being provided to a control and/or regulation unit that controls and/or regulates the actuator (or plurality of actuators) such that the desired tension or force is set in the guying.

In a preferred design, the previously described holding element could likewise be brought into engagement or out of engagement with the catch elements of the placed down guying elements by an adjustment of the erection angle of the guying support and a movement of the holding element into the holding position or into the release position can thereby be made possible (since, for example, the tension of the second guying is reduced by a pivoting of the guying support to the front in the direction of the boom head).

The length variable element can, for example, be a hydraulic tensioning cylinder, a linear drive, a jack screw, or similar.

In a further possible embodiment, two guying supports are provided that are installed at the coupling section and that each have a first and a second guying, with the guying in particular forming a spatial Y guying. The guying supports can preferably be moved from a transport position folded onto the coupling section into a guying position spread out in V shape, and vice versa, via respective tip cylinders.

All the guying elements or all the guying elements except for the respective first guying element of the second guyings connected to the connection piece are preferably formed as foldable guy rods. The advantage thereby results that such guy rods have substantially smaller tolerances and a greater stiffness than guy ropes, whereby the preloads and lengths of the two guying strands can be set more precisely and coordinated with one another with the Y guying than with comparable guying systems having guy ropes. A more stable guying and a resulting greater payload thereby results overall. The guying system in accordance with the invention furthermore has a smaller weight since heavy guy rope winches can be dispensed with.

The present invention furthermore relates to a guying system for a mobile crane in accordance with the invention. The guying system comprises at least one guying support that can be installed at a telescopic boom of the mobile crane, a first guying for connecting the guying support to a coupling section or superstructure of the mobile crane, and a second guying for connecting the guying support to a connection piece at a telescopic section of the telescopic boom. Said components can be configured in accordance with one or more of the previously described embodiments. In this respect, the same advantages and properties evidently result as for the mobile crane in accordance with the invention so that a repeat description will be dispensed with.

The present invention further relates to a method of moving a mobile crane in accordance with the invention into a guyed work position (installation of the guying). In the method in accordance with the invention, the telescopic boom is first provided as telescoped in, in particular fully telescoped n, with a slightly extended position also being able to be provided for the installation of the guying. The guying system in accordance with the invention comprising at least one guying support, the first guying, and the second guying can be transported to the deployment site separately from the rest of the mobile crane. In this respect, the guying support is in particular provided as an installation unit together with the second guying that is in a transport position and is connected to the guying support.

The guying support is installed at the position provided therefor on the coupling section of the telescopic boom, in particular together with the second guying located in the transport position, with the latter not yet being connected to the telescopic boom.

The first guying is connected to the connection points provided for this purpose at the superstructure or, which is preferred, at the coupling section (for example at a boom base). The first guying is likewise connected to the previously installed guying support, with the order not being important in the installation of the first guying.

A first guying element of the second guying is now connected to the provided connection piece at the telescopic section of the telescopic boom, with one of the guying elements of the second guying, preferably said first guying element, being directly releasably connected to the guying support. The telescopic boom is here preferably located in a flat, downwardly luffed position to facilitate the installation.

The telescopic boom is now preferably luffed up into a steep position, for example the steepest possible position. The telescopic boom preferably adopts an angle in this position of more than 45° in comparison with a completely downwardly luffed position.

The releasable connection between the first guying element of the second guying previously directly connected beforehand to the guying support and the guying support is subsequently released. This preferably takes place automatically via the actuation of an actuator, with the actuator being able to be the hydraulic cylinder of the previously described holding device moving the holding element.

The telescopic boom is now telescoped out to the desired extension length. Since the guying elements of the second guying are not connected to the guying support in this state (this relates to the releasable connections of the guying element that may optionally be established-a last guying element that is permanently coupled with the guying support also remains fixedly connected to the guying support during the telescoping out). Those guying elements of the second guying that were previously held in or at a holding device of the guying support and were not part of the guying move away from said holding device here. This can in particular comprise a folding apart of these guying elements. The guying elements are in particular consecutively taken along by the respective preceding guying element due to the extension movement of the boom.

If the desired extension length of the telescopic boom has been reached and if a corresponding number of further guying element has here been removed or "pulled out" from the holding device, a further guying elements, in particular one of these further guying elements now no longer located in or at the holding device (i.e. pulled out and in particular folded apart by the extension process) is again (releasably) connected to the guying support so that this now connected guying element, the first guying element, and all the guying elements that may be disposed therebetween that are all coupled with one another form the second guying for the current telescopic length. Further guying elements that may be located between the guying element now releasably connected and the last guying element connected, in particular permanently, to the guying support, are held at or in the holding device and do not form any functional or force transmitting part of the second guying. The mobile crane is now ready to use and the telescopic boom is guyed.

Said steps take place in substantially reverse order for the moving of the mobile crane into a transport position in which the telescopic boom is not guyed (dismantling of the guying).

The present invention further relates to a method of varying the extension length of the already guyed telescopic boom of a mobile crane in accordance with the invention. Similarly to the previously described method of assembling the guying, the telescopic boom is here first luffed up into a steep position, for example the steepest possible position, if this position is not already present. The releasable connection between the guying element of the second guying releasably connected to the guying support and the guying support is subsequently released.

The telescopic boom can now be telescoped in or out to the desired extension length. If the telescopic boom is telescoped out, the steps take place analogously to the previously described method of installing the guying. If the telescopic boom is retracted, at least one guying element here moves into or onto the holding device of the guying support. If the desired extension length of the telescopic boom has been reached and if a corresponding number of further guying elements has here been moved or "placed" into or onto the holding device, the further guying element located closest to, but still outside, the holding device is again (releasably) connected to the guying support so that this guying element, the first guying element, and all the guying elements that may be disposed therebetween that are all coupled with one another form the second guying for the current telescopic length.

Provision is made in a possible embodiment of one or both of the aforesaid methods that the guying support is pivoted forwardly in the direction of the connection piece to release the releasable connection and rearwardly in the direction of the superstructure to establish the releasable connection, with the guying support preferably being pressed rearwardly after the establishing of the releasable connection such that a defined preload is set in the second guying. This preferably takes place permanently during crane operation.

The basis for the control and/or regulation of this pivot movement, that preferably takes place by a control and/or regulation unit of the mobile crane, can be one or more sensor measurements, for example a pressure measurement in one or more hydraulic cylinders (e.g. a tensioning cylinder of the first guying and/or a tip cylinder of the guying support), a distance or position measurement of a hydraulic cylinder, an angle measurement of a winch, a force measurement, or a length measurement (or any desired combination thereof).

Provision is made in a further possible embodiment that the first guying comprises a length variable element as previously described and the guying support is pivoted to the front or to the rear by actuation of the length variable element, with the length variable element preferably being controlled such that a defined preload is set in the first guying and/or second guying. The statements in the previous paragraph on the control and/or regulation for setting the desired preload apply analogously to the length variable element which is in particular a hydraulic tensioning cylinder.

BRIEF DESCRIPTION OF THE DRAWINGS

Further features, details, and advantages of the invention result from the embodiments explained in the following with reference to the Figures. There are shown.

DESCRIPTION OF THE PREFERRED EMBODIMENTS

Figure 1:
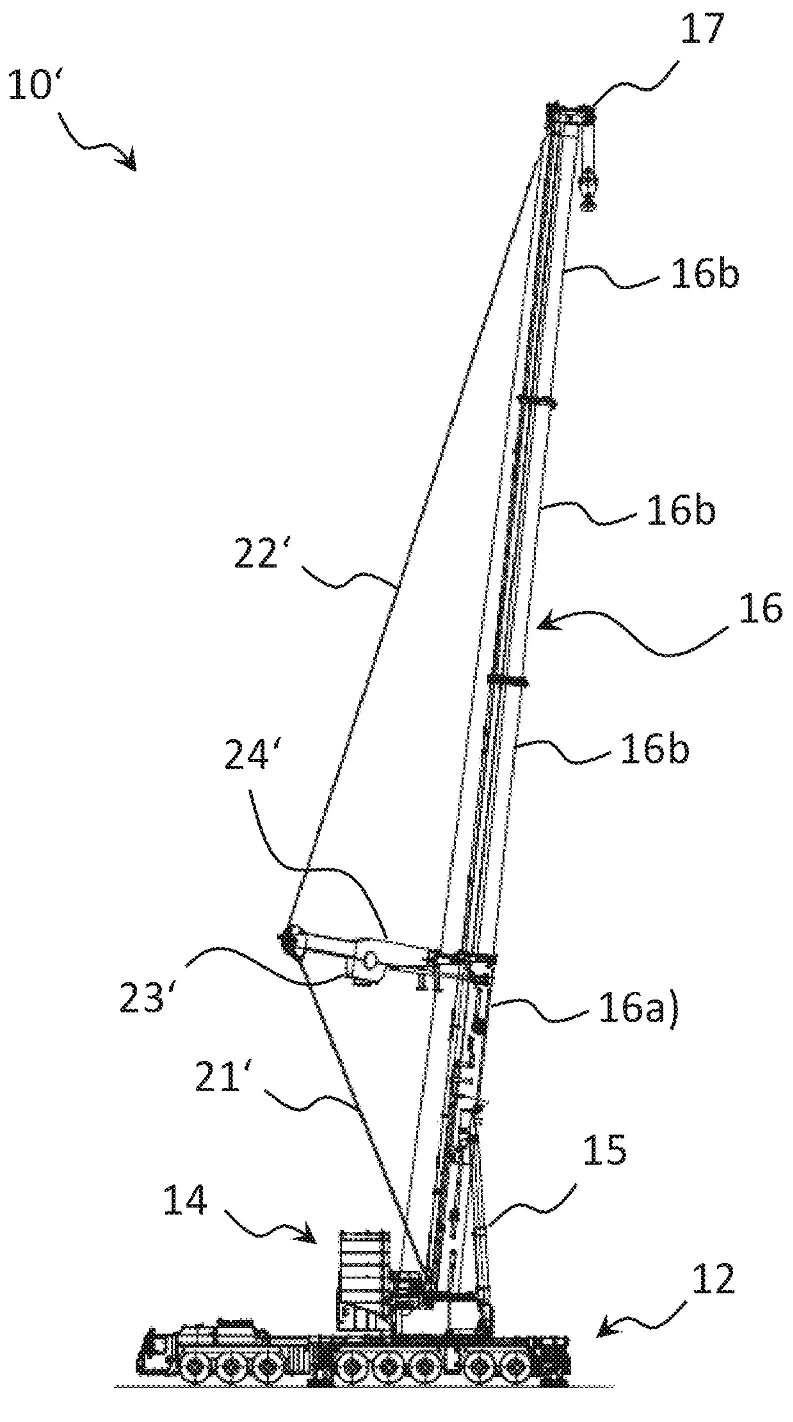
Fig. 1 (Prior Art)
FIG. 1: a mobile crane known from the prior art with Y guying in a side view.

An example of a mobile crane 10' known from the prior art is shown in a side view in FIG. 1. The mobile crane 10' comprises a travelable undercarriage 12, a superstructure 14 rotatably supported thereon about a vertical axis, and a telescopic boom 16 coupled luffably about a horizontal axis with the superstructure 14. Said telescopic boom 16 comprises a coupling section **16*a* supported at the superstructure 14 in an articulated manner and a plurality of telescopic sections 16*b* that can be telescoped in and out therein. The telescopic boom 16 is luffable up and down by means of one or more hydraulic luffing rams 15**.

The telescopic boom 16 is guyed by means of a spatial Y guying that comprises two guying supports 24' projecting from the telescopic boom 16 and spread open in V shape. Only one of the guying supports 24' can be seen in FIG. 1 due to the perspective. In the following, for reasons of simplicity, reference is made to only one of the two guying supports 24', with the following statements naturally also applying to the other guying support 24' and to the corresponding guying strand. A first guying 21' comprises a plurality of guy rods and connects the guying support 24' to a boom base of the coupling section 16*a*. The guying support 24' is connected to a connection piece at the boom head 17 via a length variable second guying 22'. In the example shown, a hoist rope having a hook block fastened thereto for lifting a load is fastened via the boom head 17.

The second guying 22' comprises a guy rope that is supported on a guying winch 23' arranged at or in the guying support 24' in a manner able to be reeled up and down. The guying support 24' can be erected by means of a hydraulic tip cylinder from a transport position or a placement position contacting the boom 16. If the telescopic boom 16 is extended, the guying winch 23' correspondingly reels off guy rope length. Conversely on the telescoping in.

With such a mobile crane 10', the installation of the guying can take place as follows: The guy rods of the first guying 21' are first connected to the boom base, then the guying support 24' is erected with the aid of the tip cylinder, and the guy rope of the second guying 22' is fastened to the boom head 17. The tip cylinder is also always under pressure during the crane work and presses the guying support 34' toward the guy rods of the first guying 21'. Once the telescopic boom 16 has been telescoped out to its desired length, it is preloaded via the guying winch 23'. This can take place via a specific force via the guying winch 23' (force controlled) or over a certain length of the guy rope (length controlled). This as a rule takes place via an angle of rotation measurement of the guying winch 23'.

To avoid the initially named disadvantages of such a rope based guying, in the mobile crane 10 in accordance with the invention the guy rope of the second guying 22' is replaced with guying elements that are coupled with one another and that remain connected to one another during the entire guyed crane operation, i.e. during guying operation. The length of the second guying 22 can be varied in accordance with the invention in that, in dependence on the desired length, one of the mutually coupled guying elements is releasably connectable to the guying support 24.

Figure 2:
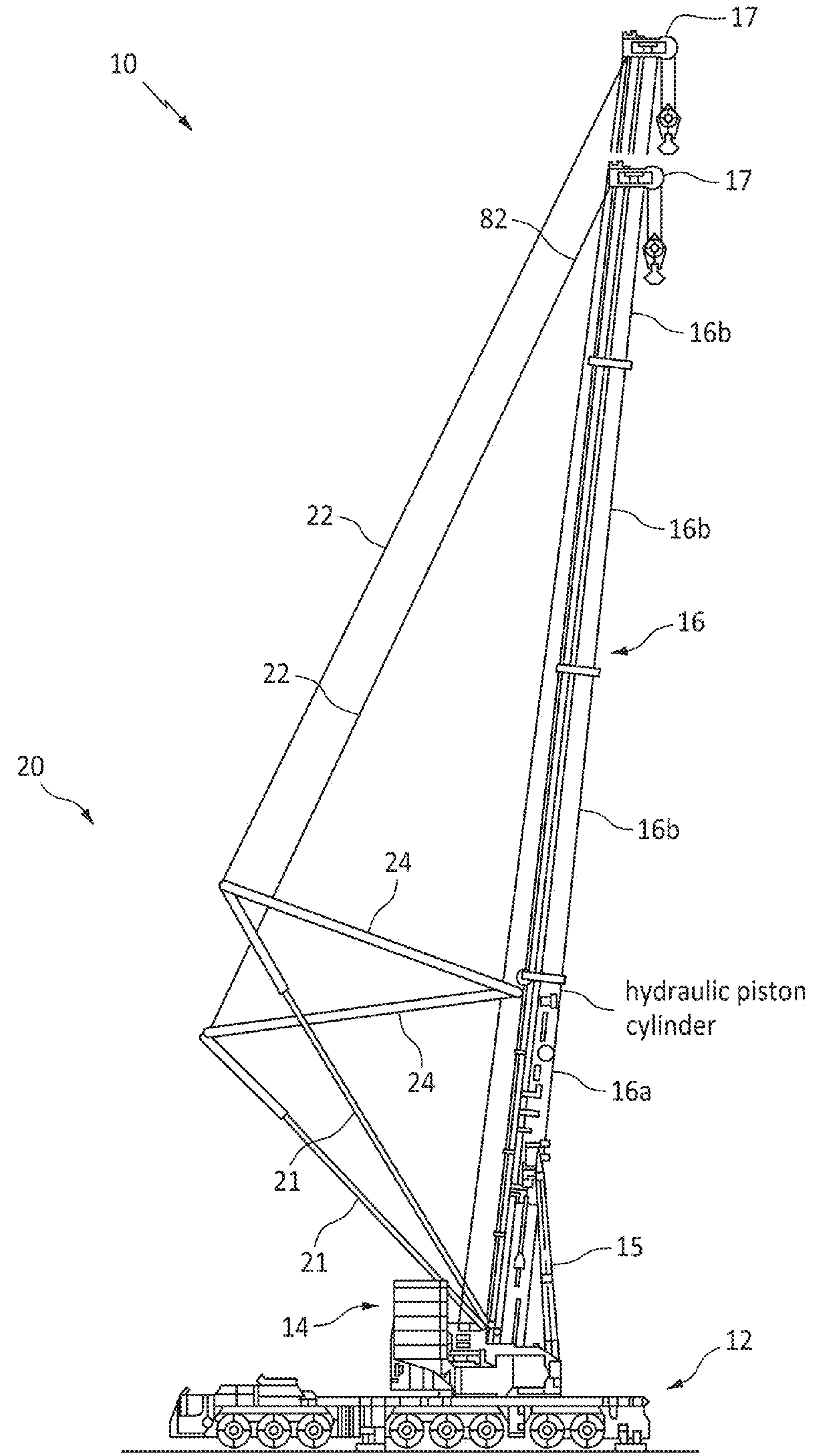
FIG. 2: an embodiment of the mobile crane in accordance with the invention in a superposed side view of two extension positions of the telescopic boom.

FIG. 2 shows an embodiment of the mobile crane 10 in accordance with the invention in a side view with here two different extension lengths of the telescopic boom 16 being graphically superposed on one another. The same reference numerals as in FIG. 1 designate the same components here so that a repeat description will be dispensed with. Components that differ from the prior art in accordance with FIG. 1 are marked by the same number, but without an apostrophe.

In the embodiment discussed in the following, all the guying elements of the second guying 22 are formed by guy rods 30, 32, 34 coupled with one another.

Figure 3:
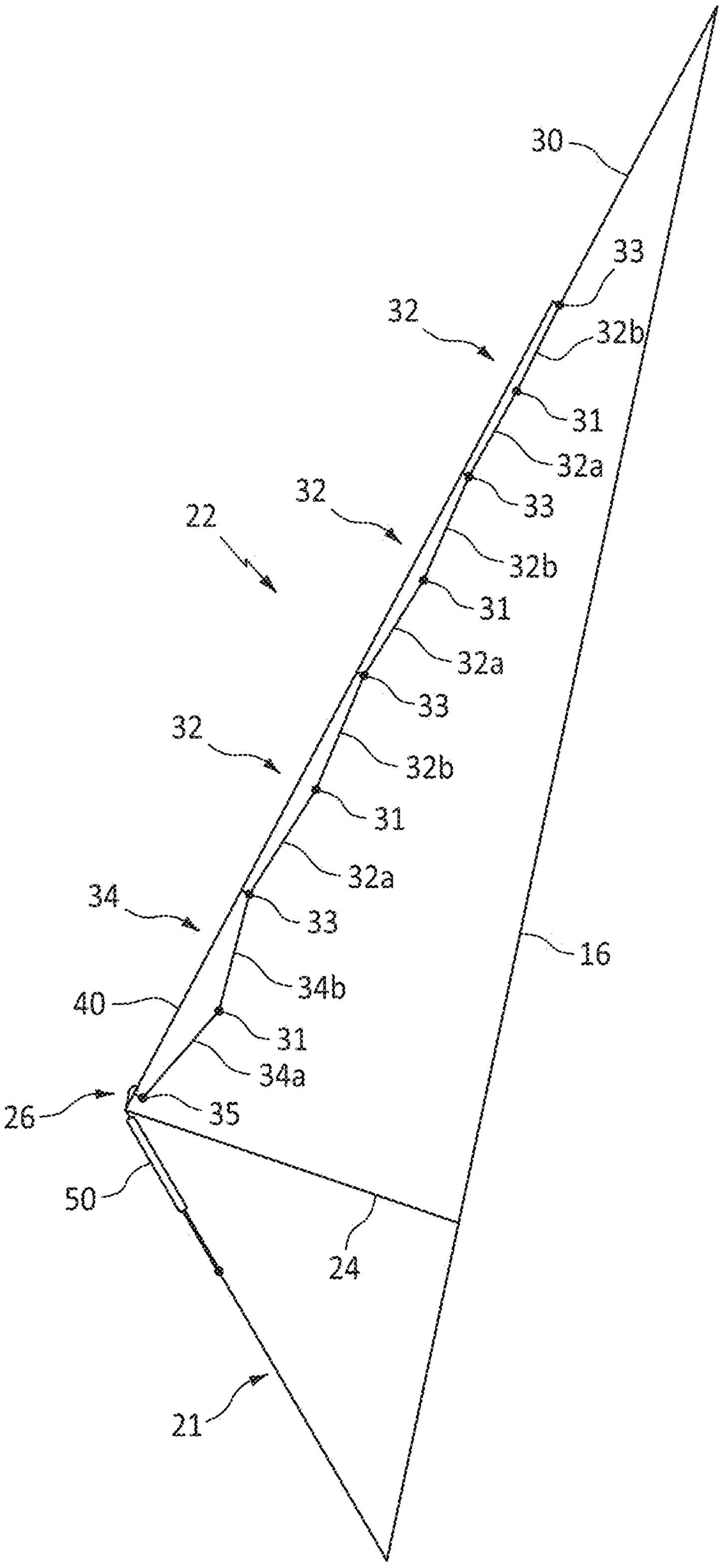
FIG. 3: a schematic side view of the guyed telescopic boom.

A schematic side view of the guyed telescopic boom 16 in accordance with such an embodiment is shown in FIG. 3. The guying support 24 can be recognized that extends to the rear almost perpendicular from the telescoped out telescopic boom 16. The guying support 24 is connected to the boom base via a first guying 21. The second guying 22 comprises a plurality of guy rods 30, 32, 34 (five in the embodiment shown here) that are connected to one another via joint connections 33. At least one guying support (24) is fastened to the coupling section (16*a*) and is connected via a first guying (21) to the coupling section (16*a*) or the superstructure (14) and via a second guying (22) to a connection piece (82) at the telescopic section (16*b*), A first guy rod 30 is directly coupled with the connection piece, not shown in any more detail here, at the tip of the innermost telescopic section. A last guy rod 34 is coupled (via the joint 35) directly and permanently with the guying support 24. In guying operation, said connections of the first and last guy rods 30, 34 remain present, i.e. they are not decoupled from the connection piece and from the guying support 24. Three further guy rods 32 are located between the first and last guy rods 30, 34.

In the specific embodiment shown here, all the guy rods 30, 32, 34 have different lengths. Furthermore, the three further guy rods 32 and the last guy rod 34 are each provided with a center joint 31 that is substantially arranged centrally between the two ends of every guy rod 32, 34. Said guy rods 32, 34 thereby each comprise a first partial rod 32*a*, 34*a* and a second partial rod 32*b*, 34*b* that can be folded onto one another by pushing together the connection joints 33 located at the ends. In other words, all the guy rods 32, 34 except for the first guy rod 30 can be folded together or are foldable. This is indicated graphically in the last guy rod 34 in FIG. 3.

It would be conceivable in principle that one or more guy rods 30, 32, 34 have more than one center joint 31 and can therefore be folded multiple times. Differing from the embodiment shown in FIG. 3, the first guy rod 30 could additionally also be foldable together via a center joint. Such an embodiment will be described further below.

Since a plurality of the guy rods 32, 34 can be folded via a center joint 31, the length of the second guying 22 can be varied without having to separate the guy rods 30, 32, 34 from one another or having to dismantle them. Those guy rods 32, 34 that are not used for the guying at a certain extension length are folded together and locked at the guying support 24, as will be explained in detail further below.

Since now a discrete number of guying elements 30, 32, 34 having defined lengths is used for the second guying instead of a continuously adjustable guy rope, a continuous covering of guyable boom extension lengths has to be achieved in a different manner.

Figure 4:
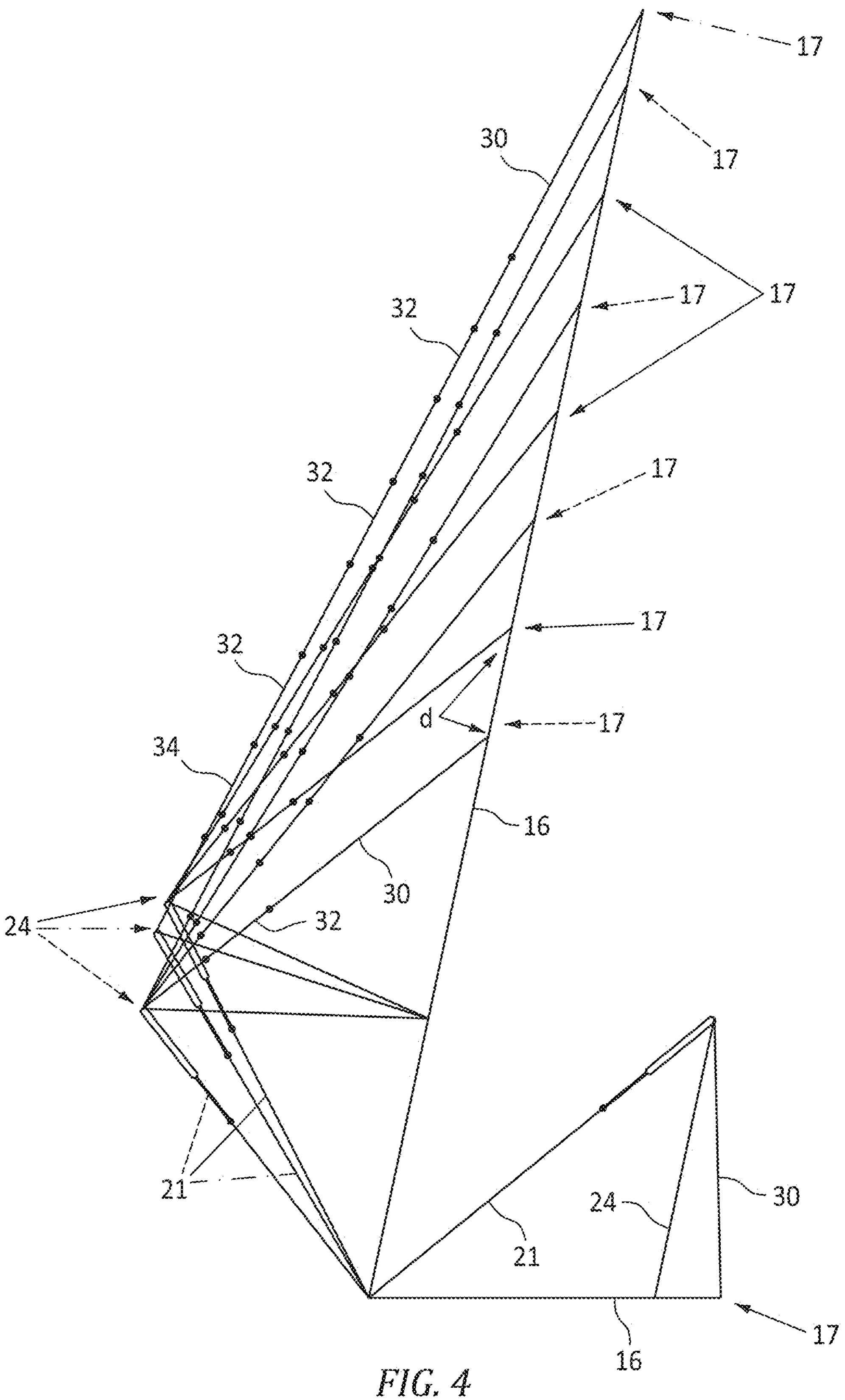
FIG. 4: different positions and extension lengths of the telescopic boom and of the guying support with different lengths of the second guying in a superposed, schematic side view.

A telescopic boom 16 is in principle operable at many different extension lengths. However, a guying is only sensible from a specific extension length onward. FIG. 4 schematically shows all the sensible lengths of the telescopic boom 16 and the associated lengths of the guy rods 30, 32, 34 of the second guying 22 in a side view, with a plurality of boom and guying support settings being shown simultaneously or superposed. The three different positions of the guying support 24 with a steep telescopic boom 16 and the corresponding positions of the first guying 21 are shown by dashed, continuous, and chain dotted arrows or lines. The associated positions of the boom head 17 at the different guying lengths for every position of the guying support 24 are indicated by correspondingly designed arrows starting from the reference numerals 17.

It must be noted here that the three discrete angular positions of the guying support 24 shown in FIG. 4 are, contrary to this schematic image, as a rule not constant or identical for the different telescopic boom lengths or guying lengths, but that every telescopic boom length as a rule requires a minimally different angular position of the guying support 24. By way of example, with reference to the rearmost angular position of the guying support 24 in FIG. 4 (dashed arrow 24), this means that the guying support 24 in particular actually adopts three slightly different angles that are, however, not taken into account or drawn in FIG. 4, for the three guying configurations belonging to this angular position.

To keep the number of guy rods 30, 32, 34 as small as possible for all the extension lengths of the telescopic boom 16, a single configuration of guy rods 30, 32, 34 (i.e.a specific total length of the second guying 22) can be used in each case for two extension lengths of the telescopic boom 16. For this purpose, the guying support 24 is inclined to the front in the direction of the boom head 17 or to the rear in the direction of the superstructure 14. This is done via the tip cylinder of the guying support 24. Two extension positions of the telescopic boom 16 are indicated by way of example in FIG. 4 by the arrows d that can be achieved using the same guy rod configuration, but a differently inclined guying support 24.

At a specific position of the guying support 24, exactly one specific extension length of the telescopic boom 16 is therefore associated with each guy rod configuration (i.e. with each defined number and sequence of guy rods 30, 32, 34). A further parameter that can be set variably or continuously is thus required to be able to guy a continuous range of telescopic boom extension lengths. Said parameter provides the guying support 24 via its angular position that can be set continuously via the tip cylinder at least within a specific angular range. An individual angle of inclination of the guying support 24 and a defined number or sequence of guy rods 30, 32, 34 are therefore associated with every extension position of the telescopic boom 16.

As can be recognized in FIG. 4, the first guy rod 30 is connected to the telescopic boom 16 in every extension position. Depending on the desired guying length, either the first guy rod 30 itself (in particular with a guying of the telescopic boom 16 that is luffed down and completely or almost completely telescoped in, as shown at the bottom right in FIG. 4)) or one of the further guy rods 32 is directly connected to the guying support 24. The maximum guying length is reached when none of the further guy rods 32 are releasably connected to the guying support 24, but the connection is rather between the guying support 24 and the second guying via the permanent joint 35 of the last guy rod 34.

To achieve a specific length of the second guying 22 between the two extreme positions (shortest guying length: the first guy rod 30 is directly connected to the guying support 24; longest guying length: none of the guy rods 30, 32 are connected to the guying support 24), each of the further guy rods 32 can be directly reversibly connected to the guying support 24. This is done by means of a holding device that is provided at the guying support 24 and that will be described further below.

To be able to vary the erection angle of the guying support 24 (i.e. the angle of inclination relative to the telescopic boom 16), the length of the first guying 21 has to likewise be corresponding varied. For this purpose, the first guying 21 has a length variable element 50 that is designed in the embodiment described here as a hydraulic tensioning cylinder. The tensioning cylinder 50 compensates the length compensation on the varying of the inclination of the guying support 24. The guy rods of the first guying 21 can moreover subsequently be set to the required preload force by the tensioning cylinder 50. The tensioning cylinder 50 can here be indirectly or directly attached to the guying support 24 or to the boom base 24, with it also being conceivable to arrange the tensioning cylinder at any other desired point of the first guying 21, for example centrally.

The tip angle of the guying support 24 is not variable as desired. An angle is optimum that allows the guying 21, 22 to project far from the telescopic boom 16 to generate an optimum guying effect.

It must be noted that a guying of the telescopic boom 16 below a specific extension length is not sensible since the telescopic boom already has a sufficient base stiffness. A telescopic boom having a maximum extension length of 60 m can be named by way of example at which a guying may be sensible from an extension length onward of approximately 26 m. It is here naturally only a specific example for the purpose of illustration and said values vary in dependence on the specific telescopic boom.

The guying system in accordance with the invention can be simply expanded. If a specific telescopic boom 16 is to be extended and guyed over its maximum extension length, the first guy rod 30 can be simply dismantled and the innermost telescopic section 16*b* can be dismantled and replaced with a packet of a plurality of telescopic sections. To increase the maximum guying length, further guy rods 32 can be installed (or, alternatively, corresponding additional rods 32 are stored in a store or in the holding device described further below). They can in turn have individually adapted lengths so that all the guy rods 30, 32, 34 are of different lengths.

It is, however, also conceivable, independently of the specific embodiment, that only some of the guy rods 30, 32, 34 differ in length or that all the guy rods 30, 32, 34 have identical lengths.

Figure 13:
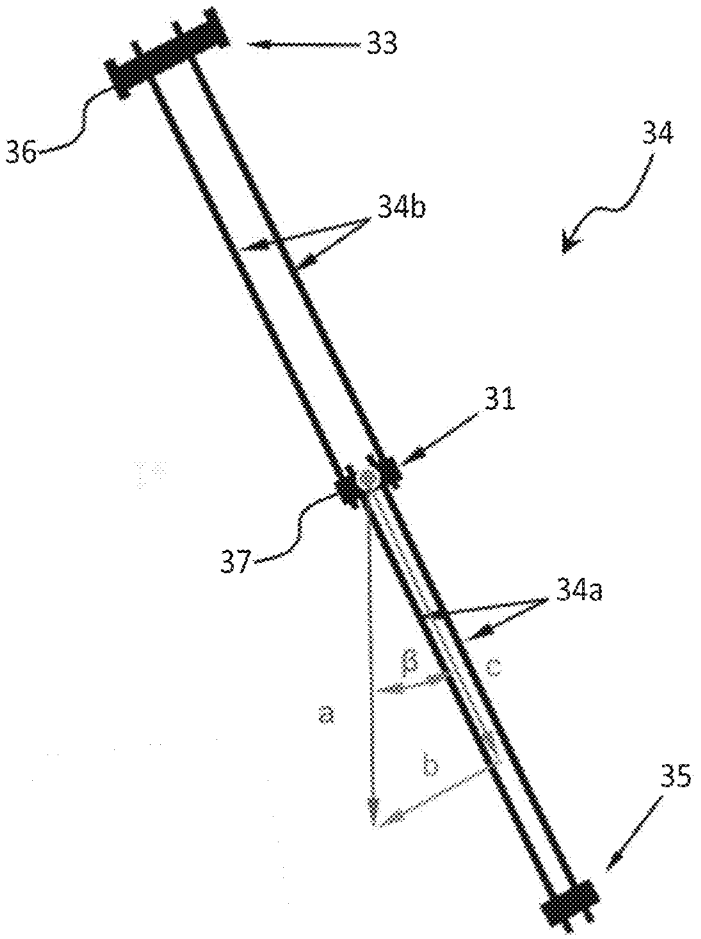
FIG. 13: a schematic plan view of the last guying element.

The foldable guy rods 32, 34 are in particular designed such as is shown in a plan view in FIG. 13, i.e. the two partial rods 32*a*, 34*a* and 32*b*, 34*b* comprise two metal sheets that extend in parallel with one another and are coupled with one another by a pivot bolt 36, equally at the connection joints 33 at the two ends. The first partial rod 32*a*, 34*a* is narrower than the second partial rod 32*b*, 34*b* and can be at least partially received in the latter (this allows the folding together up to and into an almost parallel folding position). Conversely, the first partial rod 32*a*, 34*b* could naturally be wider than the second partial rod 32*b*, 34*b*.

It will now be explained with reference to a specific embodiment in the following how the individual guy rods 30, 32, 34 are connected to one another and are guided and how a specific guying length of the second guying 22 can be achieved by a connection as required of one of the guy rods 30, 32 to the guying support 24.

As already mentioned, every further guy rod 32 and also the last guy rod 34 has a joint 31 in the middle region (it does not necessarily have to be exactly the middle between the two outer ends or joints 33—the two partial rods 32*a, b* and 34*a, b* can by all means have different lengths) so that each of these guy rods 32, 34, can be folded once.

In addition, a thin pilot rope or guide rope 40 runs from the base of the first guy rod 30 (in the region of its connection joint 33 that is spaced apart from the connection point at the telescopic section 16) to the guying support 24 and there over one or more deflection pulleys 44 onto a guide rope winch 42 in or at the guying support 24. A specific embodiment having such a single deflection pulley 44 in the region of the jib of the guying support 24 is shown in Figure, with a section through the guying support 24 along its longitudinal axis being able to be seen.

Figure 9:
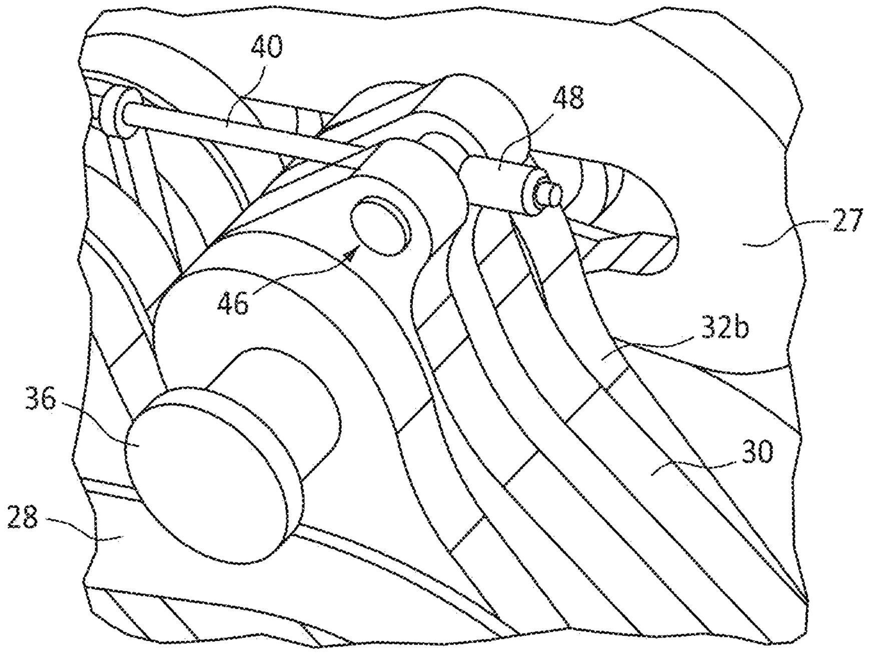
FIG. 9 a perspective view of the holding element with guying elements supported in the holding device.

The guide rope 40 is rotatably connected to the base of the first guy rod 30, and indeed such that the fastening of the guide rope 40 can rotate freely about an axis that is in parallel with the axes of rotation of the connection joints 33 between the guy rods 30, 32, 34. FIG. 9 shows a detail of the base of the first guy rod 30, with it being able to be recognized that in the embodiment shown here the guide rope 40 is fastened in a bearing bolt 46 that can rotate in parallel with the axis of the connection joint 33. The guide rope 40 is secured or connected to the bearing bolt 46 against a release therefrom via a closure sleeve 48.

All the guide rods 30, 32, 34 are suspended on the guide rope 40. The first guy rod 30 is suspended at its base and the last guy rod 34 is suspended at the guide rope 40 at its end or joint 33 disposed opposite the permanent connection joint 35 at the guy rod 24. The further guy rods 32 arranged therebetween are displaceably suspended at the guide rope 40 at its two ends or connection joints 33 (cf. also FIG. 3).

The guide rope 40 has only one guiding effect on the guy rods 30, 32, 34 on the telescoping in or out of the telescopic boom 16. The guide rope winch 42 consequently in particular always has to be acted on by a maximum reeling up force. On the telescoping of the telescopic boom 16 via the telescopic cylinder (not shown), the guide rope 40 is drawn off from the guide rope winch 42. This can preferably take place against the force of the guide winch acting in the direction of reeling up.

Alternatively, the guide rope winch 42 can also be reeled off at a defined force or speed synchronously with the extension procedure of the telescopic boom 16. For this purpose, a corresponding control and/or regulation unit can be provided that controls or regulates the guide rope winch 42 accordingly. It is important in this respect that the guide rope 40 is tensioned and acted on by a specific preload force at all times.

Figure 5:
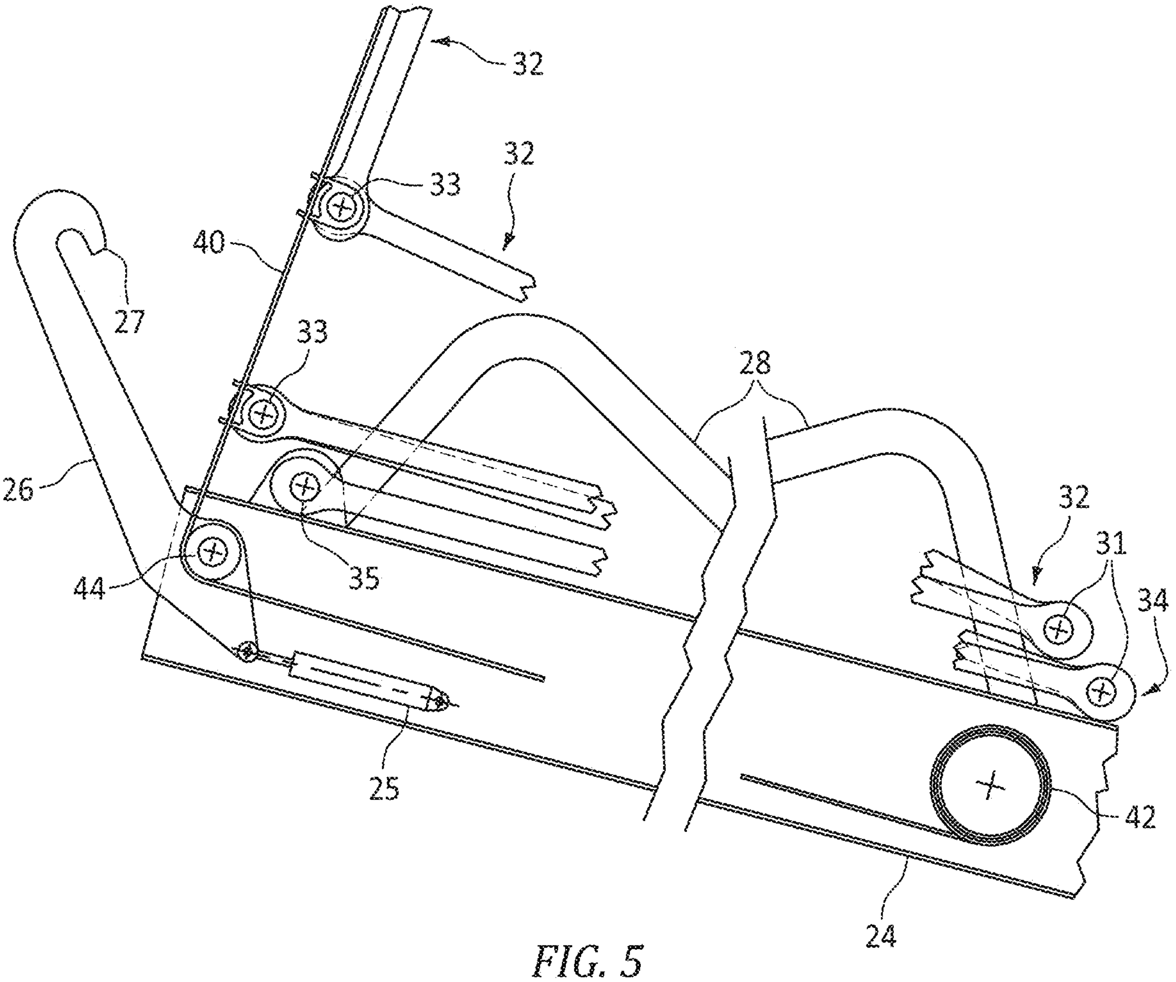
FIG. 5: a schematic side sectional view through the guying support.

The mechanism is indicated in FIG. 5 by which the guy rods 32, 34 not used for the guying can be supported and held at the guying support 24. For this purpose, a pivotably supported, latch shaped holding element 26 is located at the tip of the guying support 24 and has a hook element 27 at its end facing the first guying element 30. The pivot axis of the holding element 26 extends in parallel with the axes of rotation of the joints 33 of the guy rods 30, 32, 34 and is located in the region of the deflection pulley 44 for the guide rope 40. The connection joints 33 each comprise a catch bolt or pivot bolt 36 about which the connected guy rods 30, 32, 34 rotate freely against one another. The hook element 27 is open and configured in the direction of the pivot axis of the holding element 26 such that it can grip the pivot bolts 36 of the connection joints 33 of the guy rods 30, 32, 34 that project laterally by a specific length from the connection joints 33 for this purpose.

Via an actuator that is configured in the embodiment shown here as a hydraulic cylinder 26 that is coupled with the end of the holding element 26 spaced apart from the hook element 27, the holding element 26 can be pivoted to and fro between a release position in which the holding element 26 is outwardly pivoted away from the guide rope 44 (cf. FIG. 5) so that the pivot bolts 36 cannot come into contact with the hook element 27 and a holding position in which the holding element 26 is pivoted in the direction of the guide rope 40 and the pivot bolt 36 and the latter can be gripped by the hook element.

Figure 6:
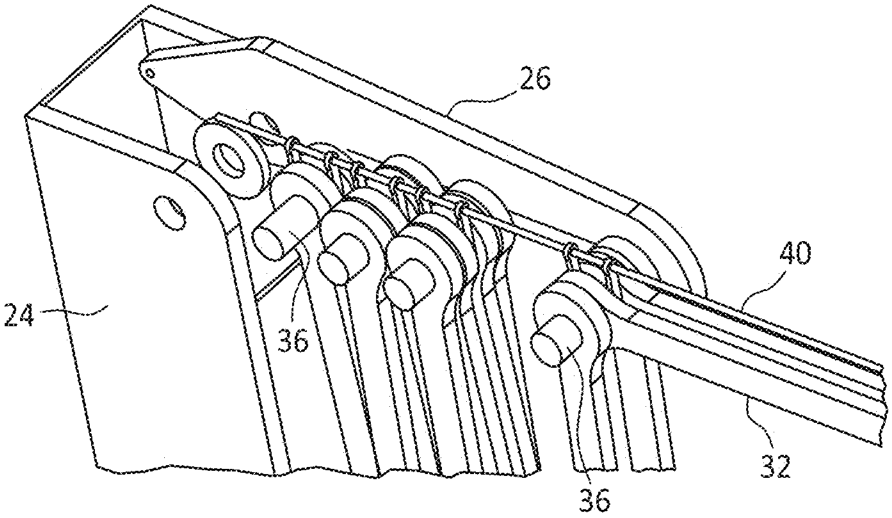
FIGS. 6-7: perspective views of the holding device of the guying support with a closed and an open holding element, with some parts being hidden.
Figure 7:
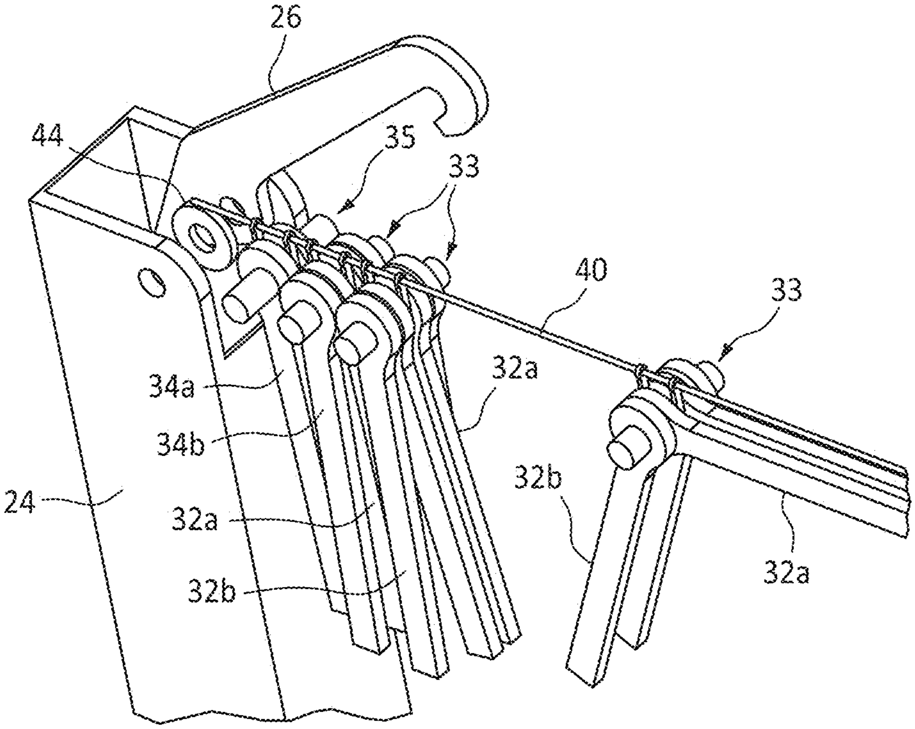

FIGS. 6 and 7 show the upper end of the guy rod 24 with the holding element 26 and some folded together guy rods 32, 34 in a perspective view, with the holding element 26 being located in the holding position in FIG. 6 and in the release position in FIG. 7.

Only half the holding element 26 is shown here and actually comprises two parallel metal sheets each having a hook element 27 to be able to grip the pivot bolts 36 of the connection joints 33 at both sides. The guide rope 40 runs between these two metal sheets of the holding element 26 and can be easily recognized in FIGS. 6 and 7.

Figure 8:
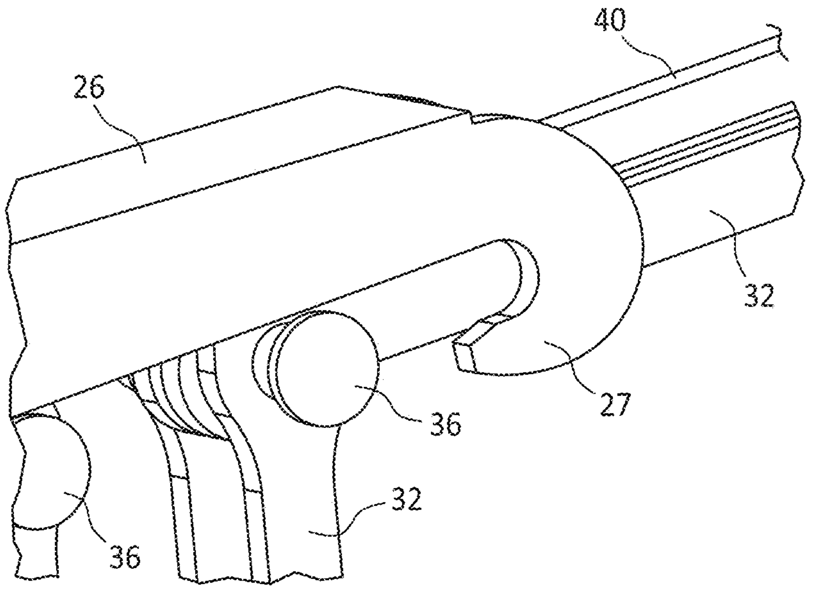
FIG. 8: a side view of the holding element with guying elements supported in the holding device.

As can be recognized in FIGS. 8 and 9, the pivot bolts 36 are shaped such that they cannot slip laterally out of the hook elements 27. For this purpose, the pivot bolts 36 in this embodiment have an increased radius or mushroom shaped closure regions at both ends so that the hook elements 24 grip the region of the pivot bolt 36 between the respective guy rod 30, 32, 34 and the closure region. The pivot bolts 36 can naturally also be designed in any other manner to prevent a slipping out of the holding element 26.

The holding element 26 or the hook elements 27 are shaped such that they securely hold the gripped pivot bolt 36 in the direction of tension of the second guying 22 in the holding position. Since each of the pivot bolts 36 is shaped in this manner at the connection joints 33 between the guy rods 30, 32, 34, the holding element 26 can grip each of these pivot bolts 36 and each of these joints 33 can therefore be directly connected to the guying support 24 via the holding element 26. FIG. 8 shows a situation in which a connection joint 33 is located between two further guy rods 32 in the vicinity of the holding elements 27 while in FIG. 9 the pivot bolt 36 of the connection joint 33 is arranged between the first guy rod 30 and the adjacent further guy rod 32 adjacent to the hook elements 27. The latter situation in which the free connection joint 33 of the first guy rod 30 is held by the holding element 26, can be present, for example, when the boom 16 completely telescoped in is only guyed by means of the first guy rod 30 (cf. FIG. 4, bottom right).

Those guy rods 32, 34 that are not used for the guying 22 are supported at the guying support 24 or in the holding device in the folded together state. In this respect, the partial rods 32*a*, 32*b*, 34*a*, 34*b* of the stored guy rods 32, 34 are more or less in parallel with one another and in parallel with the guying support 24, as can be recognized, for example, in FIGS. 5 and 11. The placed down or stored guy rods 32, 34 are in particular not in parallel with the guying direction. The forces of the guying are conducted into the guying support 24 via the connection between the hook elements 27 and the gripped pivot bolt 36 and further via the holding element 26. The holding element 26 and its pivot axis have to be adapted accordingly for the forces occurring in guying operation.

The guying support 24 comprises a guide and support device 28 that can be recognized in FIGS. 5, 9, 10, and 11 to guide the guy rods 30, 32, 34 in a controlled manner on the folding together or taking up and to provide defined positions for the support of the guy rods 32, 34 stored in the holding device and for the gripping of the pivot bolts 36 by the holding element 26. The guide and support device 28 comprises two curved holding rails that extend from the region of the pivot axis of the holding element 26 of the guying support 24 substantially in a straight line away from the side of the guying support 24 facing the boom head 17 and, after a distance that substantially corresponds to the length of the holding element 26 (i.e. approximately in the region in which the hook elements 27 are in the holding position), describe an arc and again run to the guying support 24.

The two hoop shaped curved holding rails of the guide and support device 28 extend in parallel with one another and have a lateral distance from one another that makes it possible that the pivot bolts 36 can be placed thereon without slipping down. The closure regions of the pivot bolts 36 are in particular just laterally outside the holding rails so that the pivot bolts 36 cannot slip laterally from the holding rails.

Figure 11:
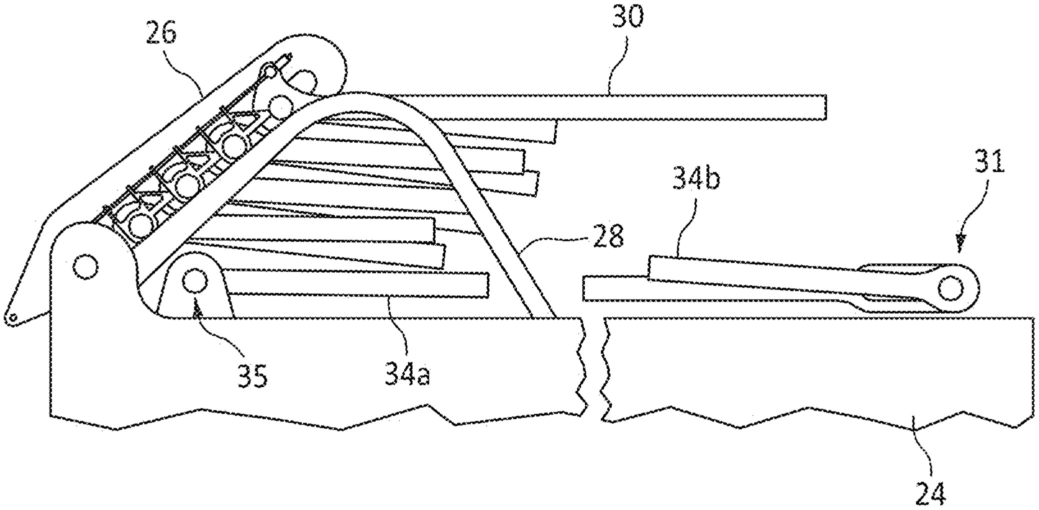
FIG. 11 a side sectional view of the holding element with guying elements supported in the holding device, with some parts being hidden.

The holding rails of the guide and support device 28 can only serve the placement and guidance of the pivot bolts 36 of the connection joints 33 of the guy rods 30, 32, 34, as is shown, for example in FIG. 11. Alternatively, the lower part of the holding rails can extend so far downwardly that the pivot bolts 37 of the center joints 31 (see FIG. 12 for a more detailed view of a specific embodiment) are also guided by the holding rails. Finally, a further embodiment is also indicated in FIG. 5 in which two pairs of holding rails are provided: an upper pair for supporting and guiding the pivot bolts 36 of the connection joints 33 (as shown in FIG. 11) and a lower pair for guiding the pivot bolts 37 of the center joints 31.

Due to the special shape of the holding rails of the guide and support device 28, the guy rods 32, 34 are correctly guided telescoping in on the folding together and are held or supported in a defined position. It is additionally ensured that the last guy rod 34 and the further guy rods 32, and additionally also the first guy rod 30 during transport, cannot fall off to the side.

Figure 10:
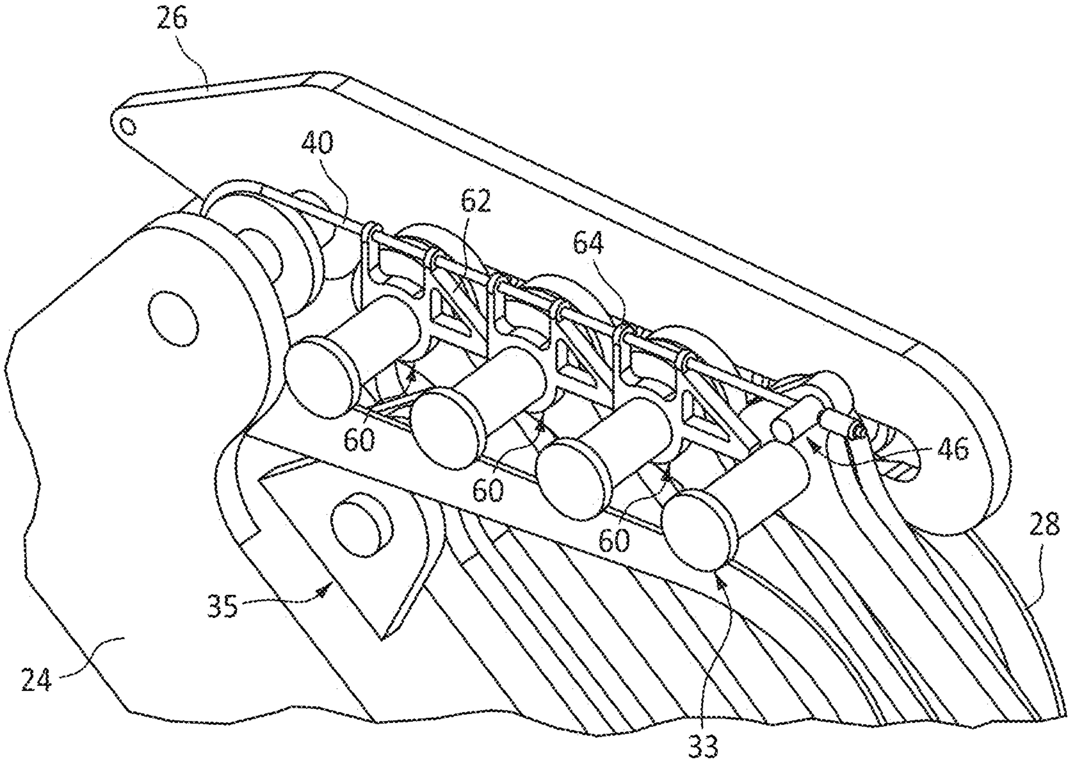
FIG. 10 a further perspective view of the holding element with guying elements supported in the holding device, with some parts being hidden.

FIGS. 10 and 11 show the holding device in a perspective view (FIG. 10) and in a side sectional view (FIG. 11), with all the connection joints 33 being placed on the holding rails of the guide and support device 28 and the holding element 26 being in the holding position. The first guy rod 30 faces to the right in parallel with the other folded together guy rods 32, 34 (cf. FIG. 11). The boom 16 is thus not guyed in this configuration, but the guying support 24 is rather shown together with the guy rods 30, 32, 34 of the second guying 22 in a transport position. The holding element 26 prevents the guy rods 30, 32, 34 from slipping from the holding rails. The guide rope 40 is completely wound up onto the guide rope winch 42.

This packet of guying support 24 among folded together guy rods 30, 32, 34 of the second guying preferably represents an installation unit that can be installed together at the coupling section 16*a* of the telescopic boom 16.

The holding device during guying operation is shown in FIG. 6, with the last guy rod 34 and two further guy rods 32 being fixed folded together in the holding device and the pivot bolt 36 of the connection joint 33 being gripped by the holding element 26 between the second and third further guy rods 32 (counted starting from the last guy rod 34).

If now a different telescopic boom length is desired, the holding element 26 is raised via the hydraulic cylinder 25 into the release position (see FIG. 7). The tensioning cylinder 50 has to relax the system beforehand in that it extends and inclines the guying support 24 to the front. The hook elements 27 thereby move away from the previously gripped pivot bolt 36 so that now the holding element 26 can be raised or pivoted. The telescopic boom 16 can now be extended, for example, whereby the next folded together guy rod 32 is unfolded or pulled out (see FIG. 7 in which it can be recognized how the partial rods 32*a*, 32*b* of the first folded together guy rod 32 fold apart and have a greater angle to one another than in FIG. 6).

Subsequently, after reaching the desired telescopic boom length, the holding element 26 is again lowered into the holding position via the hydraulic cylinder 25 and automatically grips the next pivot bolt 36. For this purpose, the telescopic boom 16 has to stop in a position in which the pivot bolt 36 would not yet abut the hook elements 27 since otherwise the hook elements 27 could not engage around the pivot bolt 36 or abut the pivot bolt on the pivoting into the final holding position. The hook elements 27 therefore initially have a certain distance (along the guide rope 40) from the pivot bolt 36 to be gripped in the holding position on the lowering of the hook element 26. The system is subsequently again preloaded via the tensioning cylinder, i.e. the guying support 24 is inclined to the rear by retracting the tensioning cylinder 50, whereby the second guying 22 is tensioned and the pivot bolt 36 is pressed from internal toward the hook elements.

On a length change of the telescopic boom 16, it is necessary that the telescopic boom 16 is in a position that is as steep as possible so that the guy rods 30, 32, 34 cannot slide way to the front on the guide rope 40 and the guy rods 30, 32, 34 fold reliably in the region of the guide and support device 28 (=storage region) on the telescoping in (see e.g. FIG. 5).

The holding element 26 has to have such a length that it can still reliably catch exactly the associated pivot bolt 36 in the steepest position of the telescopic boom 16 extended into a defined work position. This applies to every usable length of the telescopic boom 16.

It must be noted that the outwardly folded guy rods 30, 32, 34 do not extend exactly in parallel with the guide rope 40 due to gravity and due to the additionally center joint 31 in each guy rod segment (that is are not folded out completely linearly) and the pivot bolt 36 to be caught is thus pulled slightly upward by this effect.

In the present case the angle between the guying support 24 and the guide rope 40 is called the tensioning angle.

Figure 12:
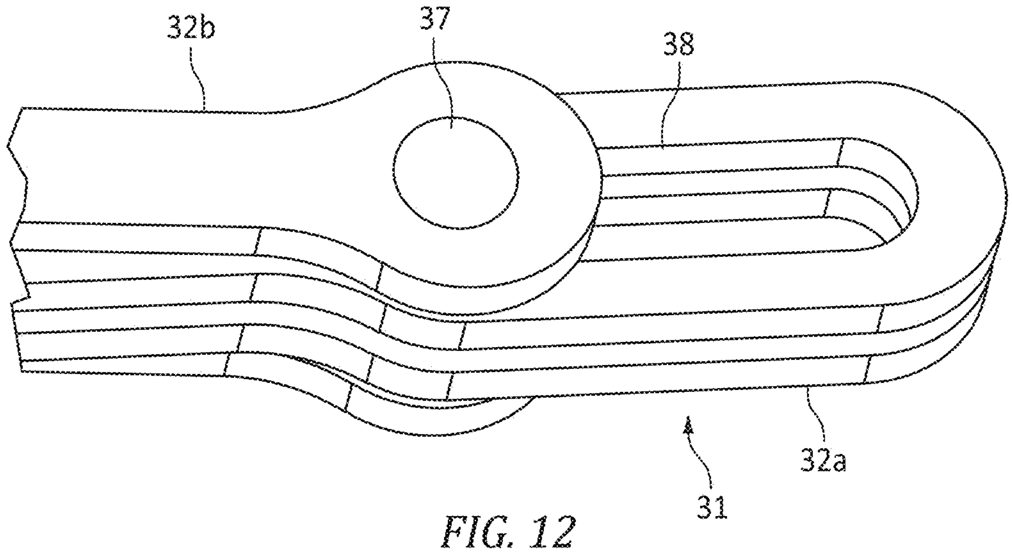
FIG. 12: a perspective view of the center joint of a guying element in the folded together state.

The center joints 31 of the guy rods 32, 34 preferably have a certain displaceability with respect to one another since otherwise the respective upper connection joint 33 (that is the upper connection joint 33 facing the first guy rod 30 in the folded out state) would press the guide rope 40 to the outside. This is avoided by an elongate hole 38 in the region of the center joint 31, as is shown in FIG. 12. This may also be necessary for the connection joint 33 to the first guy rod 30. The elongate hole 38 in the joint 31 makes it possible for the guide rope 40 to hold the connection joints 33 between two adjacent guy rods 30, 32, 34 in the region of the desired guide line. In the embodiment shown in FIG. 5, the elongate hole 48 has not been drawn in.

The force with which the guy rods 32, 34 would want to press the guide rope 40 outwardly due to this effect effects a displacement of the pivot bolts 37 of the center joints 31 in the respective elongate hole 38 until they abut its upper abutment (cf. the position of the pivot bolt 37 in FIG. 12). Since this procedure also occurs on the placement or folding together of the guy rods 32, 34, the pivot bolts 37 are already disposed at the correct point in the elongate hole 38 on the placing down.

This will be explained again with reference to the example shown in FIG. 7. The pivot bolt 36 of the connection joint 33 between the last guy rod 34 and the following further guy rod 32 is disposed further away from the free end of the guying support 24 than the pivot bolt 36 of the permanent connection joint 35 of the last guy rod 34 at the guying support 24 in the stored or folded together state. This movement or alignment is permitted by the corresponding elongate hole 38 at the center joint 31 of the last guy rod 34. The same applies to the other folded guy rods 32. It is thereby in particular possible that an imaginary line through the pivot bolts 36 of all the guy rods 32, 34 placed in the guide and support device 28 extends at a tensioning angle <90° to the longitudinal axis of the guying support 24.

The different partial rods 32*a*, 32*b*, 34*a*, 34*b* of the foldable guy rods 32, 34 can have different lengths. This can assist a flawless function and avoid an unwanted erection of the guy rods 32, 34 in interaction with said elongate hole 38.

The shape of the holding rails of the guide and support device 28 is preferably selected such that the pivot bolts 36 are guided in a specific position. This position is in particular used on the transport of the Y guying device.

The holding rails are also in particular shaped such that they release the pivot bolts 36 when the shortest length of the telescopic boom 16 has to be guyed. In other words, in such a situation when the tensioning angle is particularly small, the pivot bolt 36 of the connection joint 33 of the first guy rod 30 should not press onto the holding rails through the guying. Neither the preload force nor the guying force should be led off via the holding rails. The holding rails are therefore already downwardly chamfered in that region in which the pivot bolt 36 of the connection joint 33 of the first guy rod 30 comes to lie (cf. FIG. 9) so that the pivot bolt 36 itself does not press onto the holding rails at the tensioning angle present in this situation.

Since the guide rods 30, 32, 34 or their connection regions with the guide rope 40 should not lie on one another in the region of the guide rope 40 (risk of abrasion and catching in different guying conditions, see FIG. 4), spacer elements 60 can be present between the suspension points of the guy rods 30, 32, 34 at the guide rope 40 (see FIG. 10). The spacer elements 60 are pivotably supported about the pivot bolts 36 of the connection joints 33 and are arranged between the bolt bosses of the partial rods 32*a*, 32*b*, 34*a*, 34*b*. Every pivot bolt 36 of a connection joint 33 is provided with such a spacer element 60.

The spacer elements 60 on the one hand comprise a first spacer 63 that faces (viewed from the last guy rod 34) in the direction of the following connection joint 33 of the following guy rod 32, 30 and a mechanical abutment for the following spacer element 60. In the stored state, the spacer elements 60 abut one another via said abutments of the first spacer 62 (cf. FIG. 10) so that the pivot bolts 36 adopt a defined distance from one another along the guide rope 40. The first spacers 62 can naturally also face in the direction of the preceding connection joint 33 or in both directions and can have corresponding abutments.

The spacer elements 60 further each comprise a second spacer 64 that comprises the connection points with the guide rope 40 and provides that the respective pivot bolt 36 always has a defined distance from the guide rope 40. The connection points of the second spacers 64 with the guide rope 40 can have slide points and/or rollers that facilitate a displacement of the spacer elements 60 along the guide rope 40 or minimize wear.

The guy rods 30, 32, 34 or parts thereof can be produced from steel and/or from CRP.

A specific example of a method of installing the guying in accordance with the invention at a telescopic boom 16 or of establishing the working ability of a mobile crane 10 will now be discussed in the following. For reasons of simplicity, the following example only relates to a single guying strand of a double-strand Y guying, with a guying having only one single guying support 24 naturally also being possible.

A separate transport of the total Y guying device with the second guying 22 (guying support 24, tip cylinder, first guy rod 30, further guy rods 32, last guy rod 34, guide rope 40, and guide rope winch 42) and of the first guying 21 (guy rods and tensioning cylinder 50) first takes place. In the transport state, all of the guy rods 30, 32, 34 are secured in their positions in the holding device at the guying support 24. The pivot bolt 36 of the connection joint 33 between the first guy rod 30 and the further guy rod 32 connected thereto is positioned between the holding rails of the guide and support device 28 and the holding element 26 and against its hook elements 27 in the storage region. The first guide rod 30 is connected at its free end (to which it would be connected to the connection piece in guying operation) to the base of the guying support 24 (not shown). The guy rods 30, 32, 34 can be held in position in the region of their pivot bolts 36 by a part of the holding rails.

This system is placed as a unit by suitable means onto the substantially horizontally aligned and fully telescoped in boom 16. The guying supports 24, the tip cylinder, and the guy rods of the first guying 21 are bolted to the coupling section 16*a* of the telescopic boom 16 or the tip cylinder and the tensioning cylinder 50 are hydraulically connected to a hydraulic system of the mobile crane 10.

The guying support 24 is subsequently erected via the tip cylinder (a plurality of tip cylinders can also be provided per guying support 24). The tip cylinder sets the guying support 24 to the frontmost position (i.e. it is inclined as far as possible to the front). The guying support 24 is subsequently adjusted by the tensioning cylinder 50 (the pressurized tip cylinder is thereby overpressured against the pump pressure) such that the first guy rod 30 can be comfortably pulled to the boom head 17 by hand and can be bolted there.

The telescopic boom 16 is now luffed up into a steep or steepest position. The tensioning cylinder 50 extends completely so that the guying support 24 is pressed into the frontmost position via the tip cylinder. In this respect, the previously gripped pivot bolt 36 is moved out of the direct region of the hook elements 27. The holding element 26 is pivoted into the release position via the hydraulic cylinder 25.

The telescopic boom 16 subsequently telescopes to its target position and the guy rods 32, 34 are taken along via the first guy rod 30. After reaching the desired boom length, the holding element 26 is again lowered into the holding position via the hydraulic cylinder 25. The hydraulic cylinder 25 is also continuously supplied with pressure after the lowering of the holding element 26 so that it can compensate the different angles (between the holding element 26 and the guying support 24) at all telescopic lengths. The counterforce is generated by the guide rope 40 continuously tensioned by means of the guide rope winch 42 and subsequently, in the guyed state, by the force in the second guying that arises due to the load.

The system is subsequently preloaded via the tensioning cylinder 50 so that the pivot bolt 36 decisive for the respective telescopic length is reliably seated in the hook elements 27 and the desired preload force is adopted in the system. To achieve the desired and reproducible preload force, this can be implemented by a pressure measurement in the tensioning cylinder 50 or a length measurement device at the tensioning cylinder 50 (=distance based guying). The mobile crane 10 is now ready for use (guying operation).

The removal takes place in reverse order.

The telescopic boom 16 is first luffed up into a steep or steepest position to carry out a telescopic length change in guyed operation. The tensioning cylinder 50 extends completely so that the guying support 24 is pressed into the frontmost position against the pressure of the tip cylinder. In this respect, the hook elements 27 or the previously gripped pivot bolts become free. The holding element 26 is raised into the release position via the hydraulic cylinder 25 and the telescopic boom 16 telescopes in or out to its new target. In this respect, the guy rods 32, 34 are either removed from the storage region of the holding device and the holding rails via the first guy rod 30 and in so doing are folded apart or placed down there and folded together in so doing. The holding element 26 is subsequently again lowered into the holding position via the hydraulic cylinder 25 and the guying system is again brought to a defined preload via the tensioning cylinder 50, with the pivot bolt 36 now to be gripped being drawn toward the hook elements 27. The mobile crane 10 is now again ready for use.

The guide rope is a key idea of the invention. It has a very much smaller diameter than the previously used guy ropes. In the work state, it could not alone take up the forces of the guying that occur that are known from the prior art. This in particular also applies because the guide rope 40 is taken up on the guide rope winch 42. The latter preferably always reels up the guide rope 40 with a defined force. At the guying force that occurs in crane operation, the guide rope winch 42 should release the guide rope 40 and simply reel it off due to the high force. The guide rope 40 furthermore serves only the assembly, that is the telescoping to the desired length of the telescopic boom 16. The guy rods 32, 34, and optionally also 30, are "threaded" on the guide rope 40 for this purpose.

The first guy rod 30 can optionally also be designed as a rope element. A universal joint at the connection piece of the telescopic section 16 is thereby not necessary at the laterally outwardly pivoted position of the guying support 24. A rope element can here imitate the required degrees of freedom of a universal joint and the axes of the connection joints 33 of the guy rods are still aligned in parallel. The first guying element 30 can here be designed as a rope element without having the initially mentioned disadvantages of a complete guy rope since it is not reeled up onto a winch.

It would also be conceivable in an alternative embodiment to configure the first guying element 30 as a guy rod foldable together over at least one center joint 31, to guide the guide rope 40 from the guying support 24 into the region of the connection piece (in particular at the boom head 17), to deflect it there via one or more deflection pulleys, and subsequently to guide it back to the first guy rod 30, where the guide rope 40 is finally fastened. In this case, the connection point between the guide rope 40 and the first guy rod 30 would ideally be at the other end of the first guy rod 30 at the connection piece side.

The previously observed telescopic boom 16 can be the telescopic main boom, with the second guying 22 being connected to a connection piece, for example at a telescopic head 17 or a projection of a telescopic section 17 (that does not necessarily have to be the innermost telescopic section **16*b*). Such telescopic booms can however, also be equipped with a telescopic boom extension, for example a fixed jib or a luffing fly jib. The latter can be connected to the innermost telescopic section 16*b*, to the boom head 17 for example, via a special adapter piece. In this case, the first guying element 30 of the second guying 22, in particular in the form of a rope piece 30**, can be connected to the adapter piece via an eccentric frame. The eccentric frame can be set up in accordance with the teaching of DE 10 2016 009 301 A1 to which reference is explicitly made here.

Figure 14:
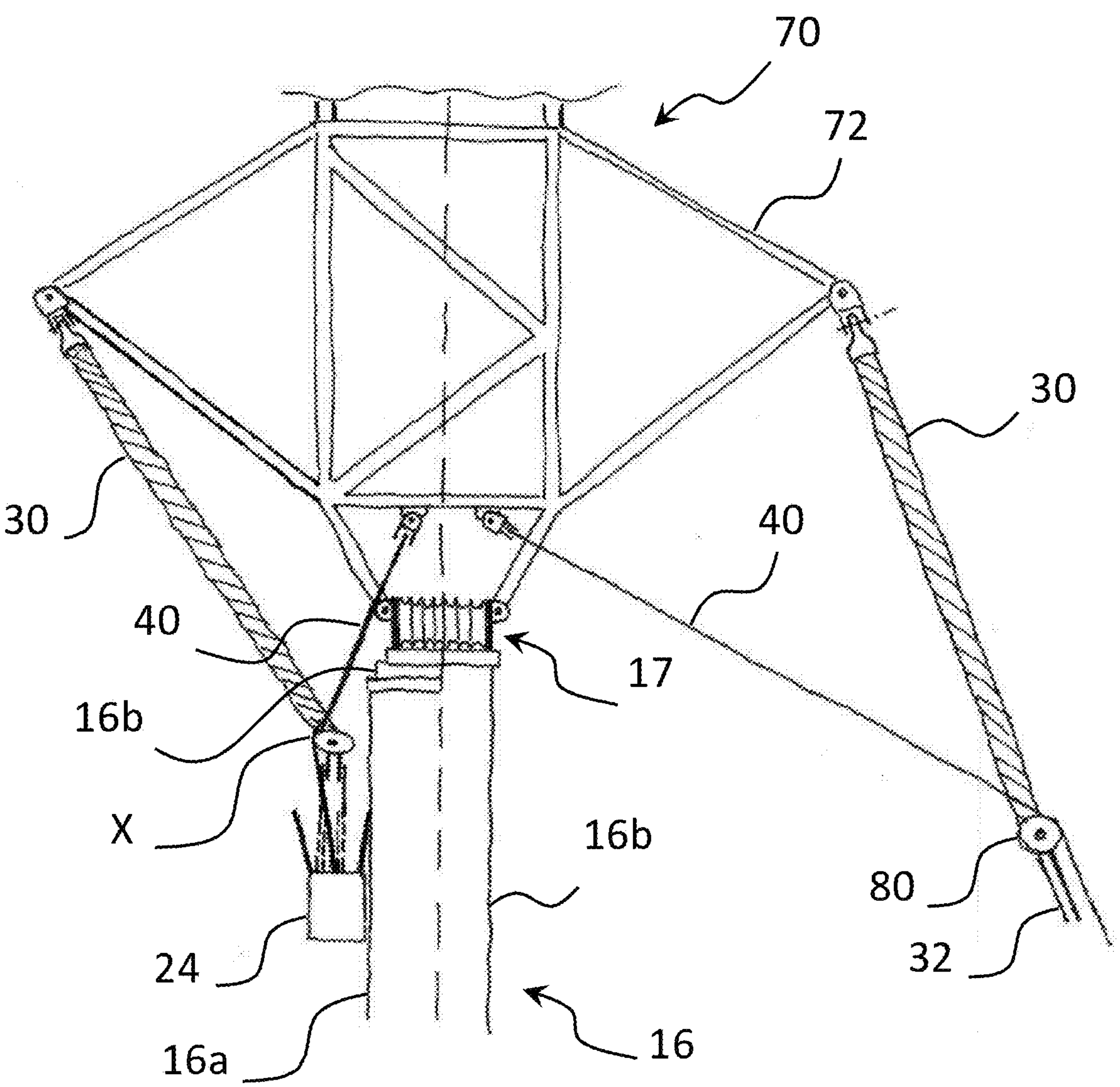
FIG. 14: a plan view of the boom head of the telescopic boom with an adapter piece installed thereon, with the right half of the drawing showing the telescopic boom in the telescoped out state and the left half showing the telescopic boom in the telescoped in state.

Such an embodiment is shown in FIG. 14 in a schematic plan view of the jib of the main boom 16 at which an adapter piece 70 having two lateral eccentric frames 71 is attached. The drawing is divided into two, with the left side showing the jib of the completely telescoped in main boom 16 with a loose guying 22 and the right side showing the jib of the innermost telescopic section **16*b* of the telescoped out main boom 16 with the guying 22 under tension (applied by the tensioning cylinder 50**) in the state capable of work.

The first guying element 30 is formed as a rope piece 30 that is coupled with the eccentric frame 72. A twist or a swivel can be necessary for the connection to avoid constraints in the connection joints 33 of the guy rods 32, 34.

The eccentric frame 72 in the embodiment shown here is attached in the region of the boom head 17 and can be part of a telescopic boom extension or of an adapter piece 70.

FIG. 13 shows a schematic plan view of the last guying element 34. The pivot bolt 36 of the connection joint 33 with the following further guy rod 32 (the latter not being shown) is located at the top left. If the guying supports 24 of the Y guying are not spread out completely in a V shape, but are rather aligned approximately in parallel with one another (cf. FIG. 14, left side), the fixed coupling points 35 of the two last guy rods 34 of the two guying strands have a smaller distance from one another than in the spread out state. In contrast, the distance between the connection points of the first guying elements 30 at the eccentric frames 72 is large in this position. An angle β hereby results between the luffing plane of the telescopic boom 16 and the longitudinal axis of the last guy rod 34 (cf. FIG. 13). In accordance with this angle β, the weight force a is divided into a force component c in parallel with the longitudinal axis of the last guy rod 34 and into a force component b perpendicular thereto. The force component b may not become too large so that a proper folding and placement of the guy rods 32, 34 in the storage region or on the holding rails can take place.

The guide rope 40 is in particular always under tension that is caused by the permanently upward reeling guide rope winch 42. The work tension in the first guying element 30 and in the guy rods 32, 34 applied in a working manner by the tensioning cylinder 50 is so large that the guide rope 40 can be guided over a deflection pulley 80 without relevant effects (cf. FIG. 14). The deflection pulley 80 replaces the bearing bolt 46 for connecting the guide rope 40 to the first guying element 30 on a use of the eccentric frame 72. The fixed point of the guide rope 40 is here transposed to a connection point disposed closer to the longitudinal axis of the telescopic boom 16.

The tensioning cylinder 50 takes the work tension from the first guying element 30 and the guy rods 32, 34 to telescope the telescopic sections **16*b* in. Substantially its own weight force a and the force applied by the guide rope 40 are active. After the pivoting together of the two guying supports 24 (cf. FIG. 14, left side), the weight force a causes the deflecting force b (cf. FIG. 13). The force b would disrupt the folding process and the placing of the guy rods 32, 34 in the storage region. The force b can now counteract the tension in the guide rope 40 due to the deflection about the deflection pulley 80 and can provide a good, controlled placement. The location of the connection point of the guide rope 40 at the adapter piece 70 is selected suitably such that the outwardly acting weight force of the first guying element 30 and of the guy rods 32, 34** can be taken up.

Optionally, one or more of the further guying elements 32 cannot only comprise a center joint 31 together with a pivot bolt 37, but, for example, two such joints 31 (or also more than two). The length of such a guying element 32 can hereby be further shortened and adapted to the respective boom combination. The topmost further guy rod 32 could in particular be designed with at least two such joints 31 and can thereby be able to be further shortened in length.

The solution shown in FIG. 14 that the first guying element 30 is formed as a rope piece 30 can generally be used with any embodiment (not only on a use of an adapter piece 70 or eccentric frame 72) and optionally replace a twist in the connection to the connection piece that may be necessary with a purely rod solution.

REFERENCE NUMERAL LIST

10 mobile crane
10' mobile crane (prior art)

12 undercarriage
14 superstructure
15 luffing ram
16 telescopic boom
16*a* coupling section
16*b* telescopic section
17 boom head
21 first guying
21 first guying (prior art)
22 second guying
22' second guying (prior art)
23 guying winch (prior art)
24 guying support
24' guying support (prior art)
25 actuator
26 holding element
27 hook element
38 guide and support device
30 first guying element
31 center joint
32 further guying element
33 connection joint
34 last guying element
35 joint
36 pivot bolt
37 pivot bolt
38 elongate hole
40 guide rope
42 guide rope winch
44 deflection pulley
46 bearing bolt
48 closure sleeve
50 length variable element (tensioning cylinder)
60 spacer element
62 first spacer
64 second spacer
70 adapter piece
72 eccentric frame
80 deflection pulley

The invention claimed is:

1. A mobile crane (10) having a telescopic boom (16) that is luffably coupled with a superstructure (14) and comprises a coupling section (16*a*) and at least one telescopic section (16*b*) that can be retracted and extended therein, wherein at least one guying support (24) is fastened to the coupling section (16*a*) and is connected via a first guying (21) to the coupling section (16*a*) or the superstructure (14) and via a second guying (22) to a connection piece (82) at the telescopic section (16*b*), and the second guying (22) comprises at least two guying elements (30, 32, 34) coupled with one another, and is thereby adjustable in length, and adaptable to the extension length of the telescopic boom (16), such that at least one of the mutually coupled at least two guying elements (30, 32) is directly releasably connectable to the guying support (24), wherein a guide rope (40) is provided that runs from the guying support (24) to the connection piece or a first guying element (30) coupled to the connection piece; and the at least one of the at least two guying element (30, 32, 34) is connected to the guide rope (40).

2. A mobile crane (10) in accordance with claim 1, wherein the at least one of the at least two guying elements (30, 32, 34) is configured as a guy rod.

3. A mobile crane (10) in accordance with claim 2, wherein a first guying element (30), of the at least two guying elements, is permanently coupled with the connection piece in crane operation and is configured as a guy rope piece with a fixed length or as a guy rod.

4. A mobile crane (10) in accordance with claim 3, wherein at least two of the at least two guying elements (30, 32, 34) have different lengths.

5. A mobile crane (10) in accordance with claim 2, wherein at least two of the at least two guying elements (30, 32, 34) have different lengths.

6. A mobile crane (10) in accordance with claim 1, wherein a first guying element (30), of the at least two guying elements, is permanently coupled with the connection piece in crane operation.

7. A mobile crane (10) in accordance with claim 6, wherein at least two of the at least two guying elements (30, 32, 34) have different lengths.

8. A mobile crane (10) in accordance with claim 1, wherein at least two guying elements (30, 32, 34) of the at least two guying elements have different lengths.

9. A mobile crane (10) in accordance with claim 1, wherein the guide rope (40) is supported on a guide rope winch (42) at or in the guying support (24) in a manner to be wound up and down.

10. A mobile crane (10) in accordance with claim 1, wherein the guying support (24) comprises a holding device having a movable holding element (26) movable by an actuator (25) from a holding position in which the holding element (26) fixes an unused guying element of the at least two guying elements (30, 32, 34) not used for guying in guying operation.

11. A mobile crane (10) in accordance with claim 1, wherein the guying support (24) comprises a guide and support device (28) on which an unused guying element (30, 32 34) of the at least two guying elements not used for guying is supportable in guying operation.

12. A mobile crane (10) in accordance with claim 1, wherein the guying support (24) is fastened in an articulated manner to the coupling section (16*a*).

13. A mobile crane (10) in accordance with claim 1, wherein the first guying (21) comprises a length variable element (50), by which the length of the first guying (21) is variable, with the length variable element (50).

14. A mobile crane (10) in accordance with claim 1, wherein two guying supports (24) are fastened to the coupling section (16*a*) by a respective first and second guyings (21, 22).

15. A mobile crane (10) in accordance with claim 1, comprising the at least one guying support (24) that can be installed at the telescopic boom (16) of the mobile crane (10), the first guying (21) for connecting the guying support (24) to the coupling section (16*a*) or superstructure (14) of the mobile crane (10), and the second guying (22) for connecting the guying support (24) to the connection piece at the telescopic section (16*b*) of the telescopic boom (16).

16. A method of moving a mobile crane (10) in accordance with claim 1 into a guyed work position, comprising the steps:

providing the telescopic boom (16) in a telescoped in state and providing the guying support (24);

installing the guying support (24) at the coupling section (16*a*) of the telescopic boom (16);

connecting the first guying (21) to the superstructure (14) or coupling section (16*a*) and to the guying support (24);

connecting a first guying element (30) of the second guying (22) to the connection piece of the telescopic boom (16), with one of the guying elements (30, 32):

releasing the releasable connection between said guying element (30, 32) and the guying support (24), with the telescopic boom (16);

telescoping out the telescopic boom (16) to a desired extension length, with at least one guying element (30, 32) here moving away from a holding device of the guying support (24); and establishing a releasable connection of a further guying element (32) to the guying support (24).

17. A method in accordance with claim 16, wherein the guying support (24) is pivoted forwardly in the direction of the connection piece to release the releasable connection and rearwardly in the direction of the superstructure (14) to establish the releasable connection.

18. A method in accordance with claim 16, wherein the first guying (21) comprises a length variable element (50) by which the length of the first guying (21) is variable, and the guying support (24) is pivoted to the front or rear by actuation of the length variable element (50), with the length variable element (50).

19. A method of varying the extension length of the telescopic boom (16) of a mobile crane (10) in accordance with claim 1, comprising the steps:

luffing up the telescopic boom (16), with one of the guying elements (30, 32) being releasably connected to the guying support (24);

releasing the releasable connection between said guying element (30, 32) and the guying support (24); and telescoping out or in the telescopic boom (16) to a desired extension onto a holding device of the guying support (24).

20. A mobile crane (10) having a telescopic boom (16) that is luffably coupled with a superstructure (14) and comprises a coupling section (16*a*) and at least one telescopic section (16*b*) that can be retracted and extended therein, wherein at least one guying support (24) is fastened to the coupling section (16*a*) and is connected via a first guying (21) to the coupling section (16*a*) or the superstructure (14) and via a second guying (22) to a connection piece (82) at the telescopic section (16*b*), and the second guying (22) comprises at least two guying elements (30, 32, 34) coupled with one another, and is thereby adjustable in length, and adaptable to the extension length of the telescopic boom (16), such that at least one of the at least two mutually coupled guying elements (30, 32) is directly releasably connectable to the guying support (24), wherein at least one of the at least two guying elements (30, 32, 34) is configured as a guy rod, wherein a first guying element (30) of the at least two guying elements is permanently coupled with the connection piece in crane operation and is configured as a guy rope piece with a fixed length or as a guy rod, wherein at least two of the at least two guying elements (30, 32, 34) have different lengths, wherein a guide rope (40) is provided that runs from the guying support (24) to the connection piece or first guying element (30) coupled to the connection piece, and at least one of the at least two guying elements (30, 32, 34) is connected to the guide rope (40).

* * * * *